(12) United States Patent
Iwakiri

(10) Patent No.: US 10,917,621 B2
(45) Date of Patent: Feb. 9, 2021

(54) INFORMATION PROCESSING APPARATUS, IMAGE GENERATING APPARATUS, CONTROL METHODS THEREFOR, AND NON-TRANSITORY COMPUTER-READABLE STORAGE MEDIUM

(71) Applicant: CANON KABUSHIKI KAISHA, Tokyo (JP)

(72) Inventor: Yoshiki Iwakiri, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 16/001,021

(22) Filed: Jun. 6, 2018

(65) Prior Publication Data

US 2018/0359458 A1 Dec. 13, 2018

(30) Foreign Application Priority Data

Jun. 12, 2017 (JP) .................. 2017-115406

(51) Int. Cl.
*H04N 13/117* (2018.01)
*G06T 7/00* (2017.01)
(Continued)

(52) U.S. Cl.
CPC ......... *H04N 13/117* (2018.05); *G06T 7/0002* (2013.01); *G06T 15/205* (2013.01);
(Continued)

(58) Field of Classification Search
CPC .... H04N 7/181; H04N 13/117; H04N 13/279;
H04N 13/366; H04N 21/00; H04N 5/2224; H04N 13/111; H04N 5/23296; A63F 2300/6653; A63F 2300/8076; A63F 13/06; A63F 13/10; A63F 13/5255; A63F 13/837; G06T 15/205
(Continued)

(56) References Cited

U.S. PATENT DOCUMENTS 8,723,956 B2 * 5/2014 Anderson ............ H04N 5/222
348/157
2006/0238617 A1 10/2006 Tamir
(Continued)

FOREIGN PATENT DOCUMENTS

CN 100383769 C 4/2008
EP 2150065 A2 2/2010
(Continued)

OTHER PUBLICATIONS

Extended European Search Report issued in European Appln. No. 18172564.9 dated Oct. 12, 2018.
(Continued)

*Primary Examiner* — Nathnael Aynalem
(74) *Attorney, Agent, or Firm* — Rossi, Kimms & McDowell LLP

(57) ABSTRACT

An information processing apparatus according to this invention includes a generating unit configured to generate a virtual viewpoint image in accordance with a position and/or line-of-sight direction of a viewpoint, and a notifying unit configured to send a notification of information about quality of the virtual viewpoint image generated by the generating unit.

17 Claims, 21 Drawing Sheets

(51) Int. Cl.
*H04N 13/167* (2018.01)
*H04N 13/183* (2018.01)
*H04N 13/194* (2018.01)
*H04N 13/111* (2018.01)
*H04N 13/122* (2018.01)
*H04N 13/243* (2018.01)
*G06T 15/20* (2011.01)

(52) U.S. Cl.
CPC ......... *H04N 13/111* (2018.05); *H04N 13/122* (2018.05); *H04N 13/167* (2018.05); *H04N 13/183* (2018.05); *H04N 13/194* (2018.05); *H04N 13/243* (2018.05); *G06T 2207/30168* (2013.01)

(58) Field of Classification Search
USPC .................................................. 348/143, 159
See application file for complete search history.

(56) References Cited

U.S. PATENT DOCUMENTS

2010/0026712 A1    2/2010   Aliprandi et al.
2011/0245942 A1*  10/2011   Yamamoto .......... A63F 13/5378
                                                                700/91
2012/0307020 A1*  12/2012   Hirano ................. H04N 13/246
                                                                348/49
2013/0038606 A1    2/2013   Ushiki et al.
2016/0148365 A1*   5/2016   Tsuda ....................... F27D 1/16
                                                                382/141
2016/0159281 A1*   6/2016   Jang .......................... B60R 1/00
                                                                348/148

FOREIGN PATENT DOCUMENTS

| | | |
|---|---|---|
| JP | 2003060672 A | 2/2003 |
| JP | 2012142860 A | 7/2012 |
| JP | 2014215828 A | 11/2014 |
| RU | 2452033 C2 | 5/2012 |
| WO | 2016145443 A1 | 9/2016 |

OTHER PUBLICATIONS

Office Action issued in Russian Appln. No. 2018119471 dated Jul. 4, 2019. English translation provided.

Office Action issued in Indian Appln. No. 201844021493 dated Oct. 29, 2020. English translation provided.

* cited by examiner

| | | |
|---|---|---|
| POSITION (mm) | X | −50000 |
| | Y | 0 |
| | Z | 10000 |
| DIRECTION (°) | Rx | 0 |
| | Ry | −30 |
| | Rz | 0 |

| POSITION (mm) | X | 0 |
|---|---|---|
| | Y | 30000 |
| | Z | 10000 |
| DIRECTION (°) | Rx | 0 |
| | Ry | −30 |
| | Rz | 270 |

| POSITION (mm) | X | 80 |
|---|---|---|
| | Y | 29950 |
| | Z | 10000 |
| DIRECTION (°) | Rx | 0 |
| | Ry | −30 |
| | Rz | 268 |

| | | |
|---|---|---|
| POSITION (mm) | X | 10000 |
| | Y | -20000 |
| | Z | 10000 |
| DIRECTION (°) | Rx | 0 |
| | Ry | -45 |
| | Rz | 30 |

| | | |
|---|---|---|
| POSITION (mm) | X | -50000 |
| | Y | 0 |
| | Z | 10000 |
| DIRECTION (°) | Rx | 0 |
| | Ry | -30 |
| | Rz | 0 |

INFORMATION PROCESSING APPARATUS, IMAGE GENERATING APPARATUS, CONTROL METHODS THEREFOR, AND NON-TRANSITORY COMPUTER-READABLE STORAGE MEDIUM

BACKGROUND OF THE INVENTION

Field of the Invention

The present invention relates to a technique of generating a virtual viewpoint image based on images from a plurality of cameras placed at different positions.

Description of the Related Art

A technique of performing synchronous capturing at multi-viewpoints using a plurality of cameras placed at different positions and generating a virtual viewpoint image (to also be called a free-viewpoint image) seen from a virtual camera placed at an arbitrary position other than the placement positions of the actual cameras using images at the respective viewpoints has received attention.

Japanese Patent Laid-Open No. 2014-215828 discloses a technique of generating and displaying a virtual viewpoint image corresponding to arbitrary designation using images obtained by capturing one range using a plurality of cameras arranged to surround the range.

The above-described virtual viewpoint image is generated using a plurality of images obtained by performing synchronous capturing using the plurality of cameras, as described above. Therefore, if a problem arises, for some reason, even in part of a captured image to be used to generate a virtual viewpoint image, the quality of the generated virtual viewpoint image may degrade. As an example of degrading the quality of a virtual viewpoint image, there may be a case in which captured images obtained under different capturing conditions such as different exposure conditions are used to generate a virtual viewpoint image. As another example of degrading the quality of a virtual viewpoint image, there may be a case in which a captured image including an obstacle, a captured image including sunny and shadowy areas in accordance with sunlight, a captured image blurred due to a vibration, and the like are used to generate a virtual viewpoint image. In addition, the quality of a virtual viewpoint image including a region commonly captured by a plurality of cameras may be improved, and the quality of a virtual viewpoint image including a region that cannot be captured by at least some of the plurality of cameras may degrade.

Conventionally, a technique of grasping information about the quality of a virtual viewpoint image, such as information indicating that a virtual viewpoint image whose quality is poor may be generated, has not been considered. Therefore, the conventional technique has room for improvement in terms of usability and productivity when generating a virtual viewpoint image.

SUMMARY OF THE INVENTION

According to an aspect of the invention, there is provided an information processing apparatus comprising: a generating unit configured to generate a virtual viewpoint image in accordance with a position and/or line-of-sight direction of a viewpoint; and a notifying unit configured to send a notification of information about quality of the virtual viewpoint image generated by the generating unit.

According to the present invention, it is possible to notify a user of information about the quality of a virtual viewpoint image.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First Embodiment

In the embodiment, there are a user who performs an operation of changing the position and orientation of a virtual camera (virtual viewpoint) for requesting to view/generate a virtual viewpoint image and a user who controls the position and orientation of a monitoring virtual camera. To discriminate between the users, the former will be referred to as a virtual cameraman hereinafter and the latter will be referred to as a monitor hereinafter.

The first embodiment will describe an example in which a monitoring virtual camera to be operated by the monitor is provided to confirm the quality of an image of the virtual camera operated by the virtual cameraman, and a monitoring virtual camera video based on a selected one of various monitoring paths is displayed.

Figure 1:
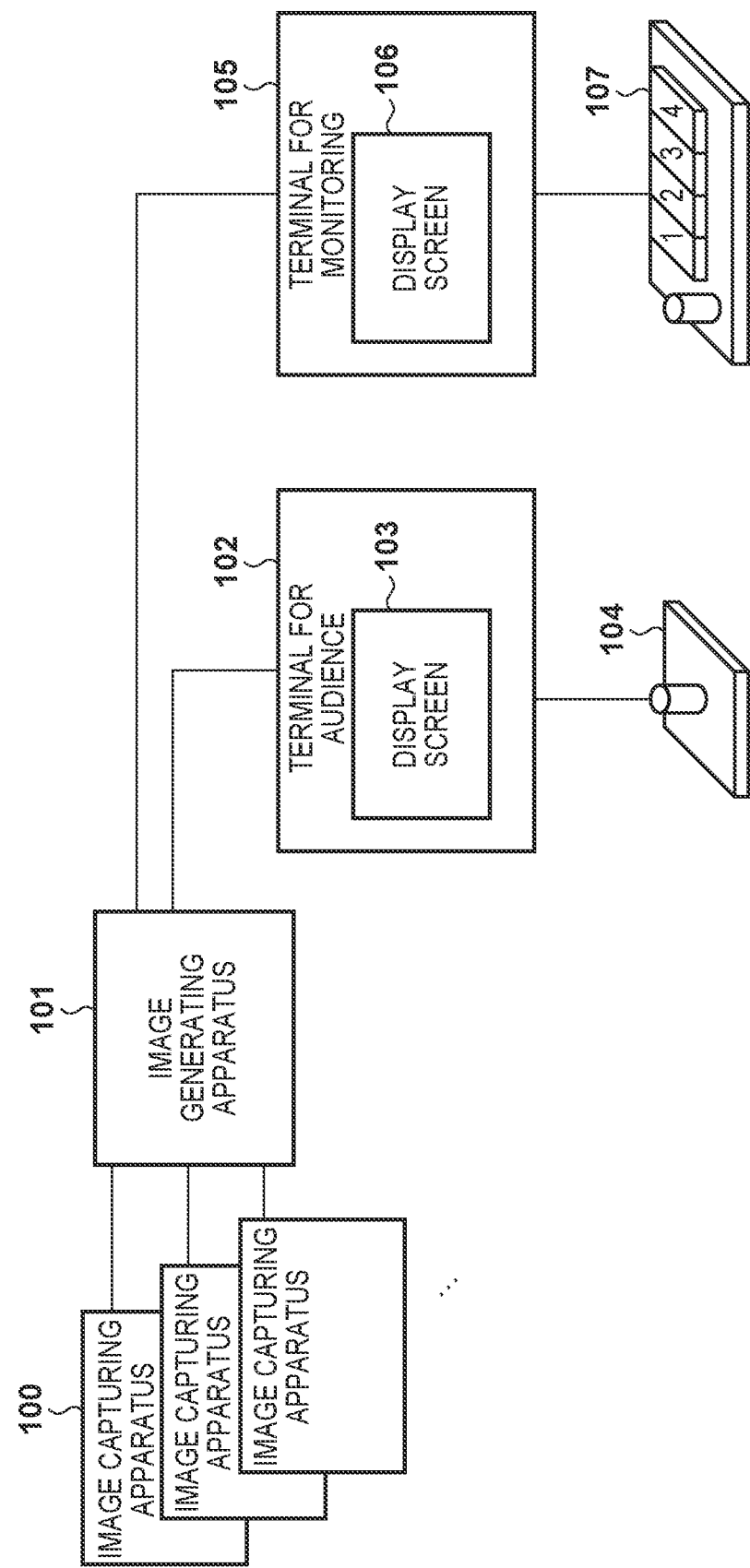
FIG. 1 is a view showing a system configuration according to the first embodiment.

FIG. 1 is a view showing the configuration of an image processing system according to the first embodiment. A terminal 102 for audience is used by the virtual cameraman to move the virtual camera and view a video at the viewpoint of the virtual camera. A terminal 105 for monitoring is used by the monitor to confirm the presence/absence of an abnormality while seeing a monitoring terminal screen 106. If there is an abnormality, the virtual cameraman is notified of it. Each device will be described in detail below. An image generating apparatus 101 and the terminals 102 and 105 are connected via a network. The image generating apparatus 101 functions as a server and the terminals 102 and 105 function as clients.

Figure 2:
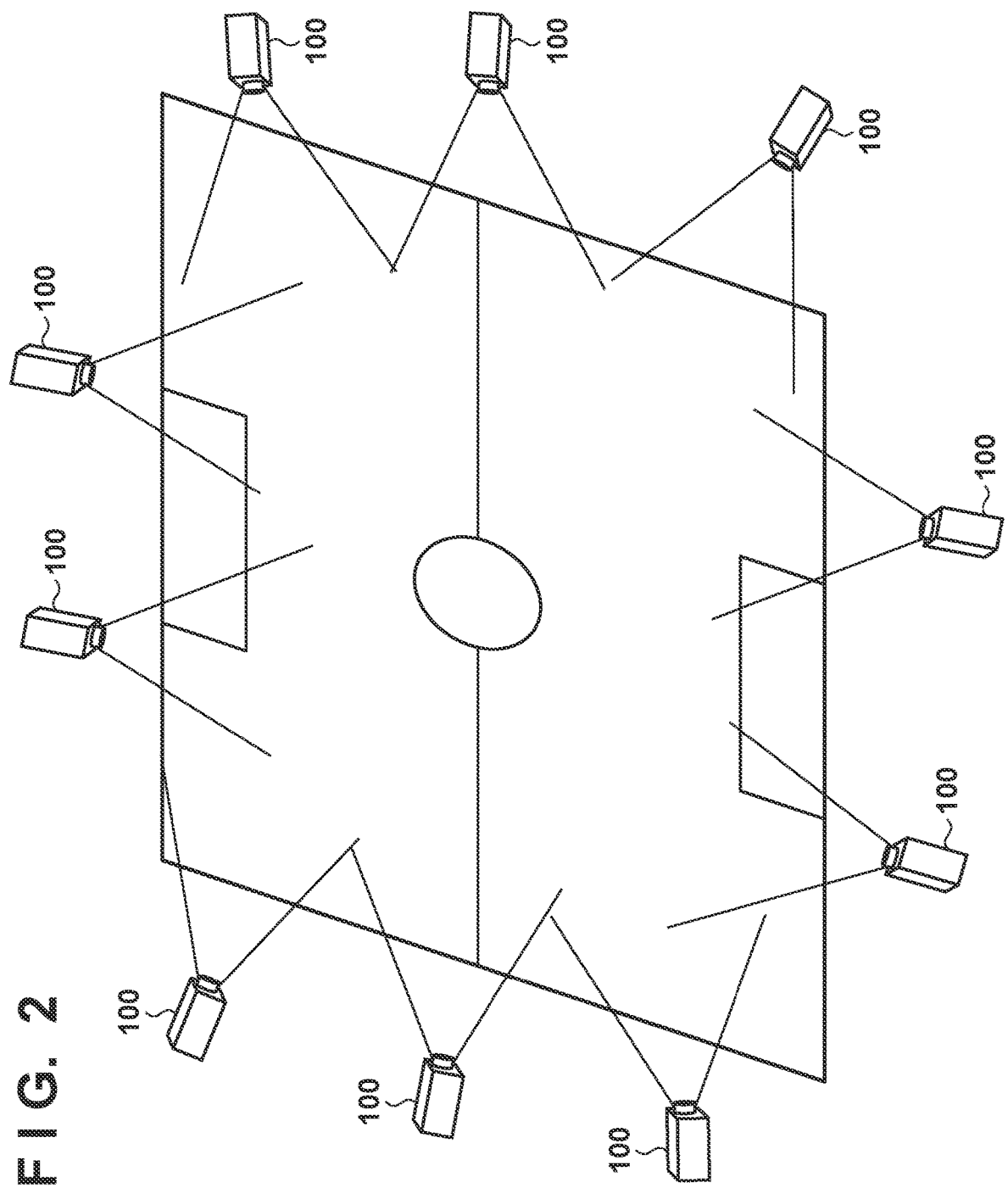
FIG. 2 is a view showing an example of the arrangement of image capturing apparatuses according to the first embodiment.

Image capturing apparatuses 100 are a plurality of (two or more) cameras, and are arranged to surround an arena such as a soccer field or a specific object to capture images. FIG. 2 shows an example of the arrangement of the image capturing apparatuses 100 according to the first embodiment. The image capturing apparatuses 100 are arranged to capture the entire or partial range of the arena such as a soccer field.

The cameras are, for example, digital cameras, and capture images at the same timing based on a synchronization signal from an external synchronizing apparatus (not shown). An image captured by each image capturing apparatus 100 is transmitted to the image generating apparatus 101 via a communication cable such as a LAN (Local Area Network) cable. Note that a communication path between each digital camera 100 and the image generating apparatus 101 may be a wired or wireless path. For the wired path, a video transmission cable such as DisplayPort or HDMI® (High Definition Multimedia Interface) cable may be used. For the wireless path, a wireless LAN may be used. Furthermore, each camera may be a camera having a still image capturing function or a camera having a moving image capturing function.

The image generating apparatus 101 accumulates images captured by the respective image capturing apparatuses 100. Assume that the image generating apparatus 101 holds information indicating the position, line of sight, and focal length of each image capturing apparatus 100. The image generating apparatus 101 inputs virtual camera control information (which is also be a virtual viewpoint image creation request) based on an operation in the terminal 102 or 105, performs conversion into virtual viewpoint information based on the virtual camera control information, and generates a virtual viewpoint image corresponding to the virtual viewpoint information from the plurality of captured images. The image generating apparatus 101 transmits the created virtual viewpoint image to the request source.

The virtual camera control information includes movement information representing movement of the position of the virtual camera and direction information for changing the line-of-sight direction of the virtual camera. The movement information indicates the difference (moving amount) with respect to the current coordinate position in a three-dimensional space in which three axial directions are defined in advance. The direction information indicates the difference with respect to the current direction of the virtual camera, that is, the line-of-sight direction (pan angle, tilt angle, and roll angle) of the virtual camera in the three-dimensional space. Note that both the movement information and the direction information may be represented by absolute coordinates, instead of the differences (relative values). Furthermore, although the virtual camera may have a zoom function, the embodiment assumes that the focal length of the virtual camera is fixed for the sake of descriptive simplicity.

Figures 3A, 3B:
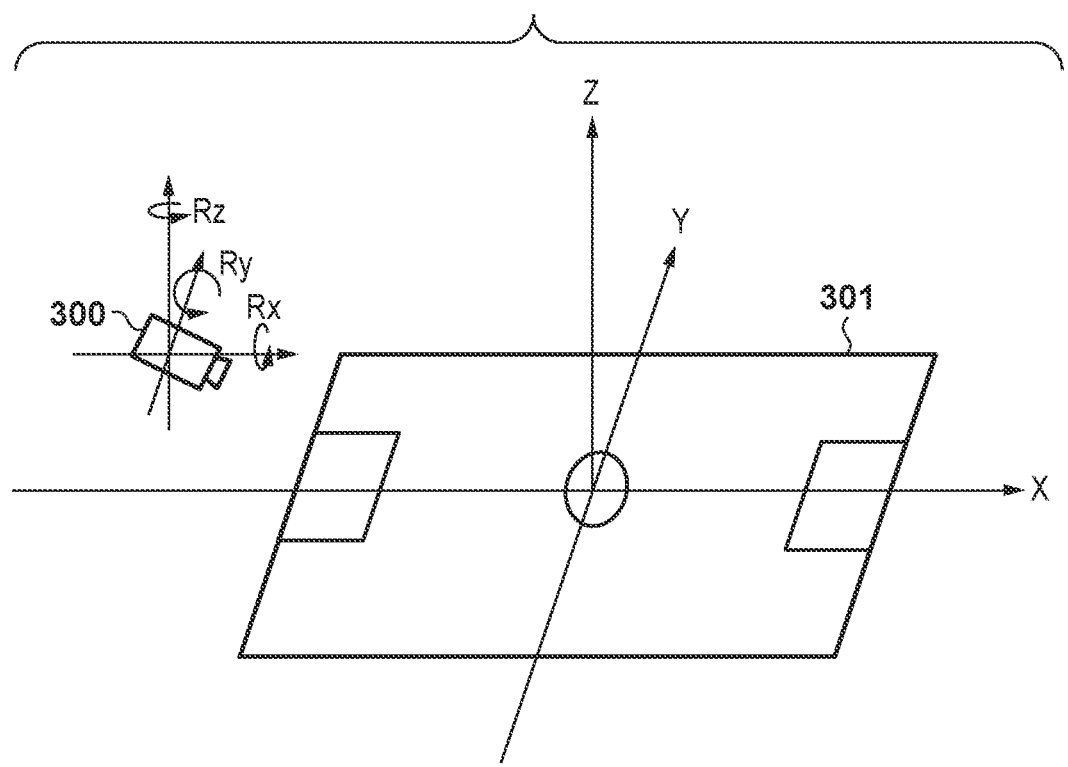
FIGS. 3A and 3B are a graph and a table respectively showing a virtual camera and virtual viewpoint information of the virtual viewpoint camera according to the first embodiment.

Virtual viewpoint information of a virtual camera 300 will be described with reference to FIGS. 3A and 3B. FIG. 3A shows the virtual camera 300 present in a capturing space. The virtual camera 300 is a virtual camera capable of capturing an image at a viewpoint different from those of the cameras included in the image capturing apparatuses 100. That is, a virtual viewpoint image generated in the virtual viewpoint image generating system is an image captured by the virtual camera 300. As shown in, for example, FIG. 3A, an image captured from an arbitrary position in the capturing space is a virtual viewpoint image.

To uniquely determine a position in the capturing space, a world coordinate system is defined. The X-, Y-, and Z-axes of the world coordinate system are determined, as follows. The center of a field 301 is set as the origin. On the field 301, the long-side direction is set as the X-axis, the short-side direction is set as the Y-axis, and the vertical direction is set as the Z-axis. The directions of the arrows of the axes each indicate the positive direction. To uniquely determine the direction of the virtual camera, Rx represents an angle around the X-axis, Ry represents an angle around the Y-axis, and Rz represents an angle around the Z-axis. The directions of the arrows each indicate the position direction.

FIG. 3B shows an example of the virtual viewpoint information of the virtual camera 300. In the virtual viewpoint information, information about the position in the capturing space and the direction of the virtual camera is stored as a table. In accordance with the table, the position and direction of the virtual camera are uniquely determined. Note that a coordinate system may be defined by another method as long as the position in the capturing space and the direction of the virtual camera are uniquely determined.

The image generating apparatus 101 is, for example, a server apparatus, and has a database function and an image processing function. An image obtained by capturing a scene of an arena in a state in which no object (no player or referee) exists, for example, before an event starts is held in advance as background image data in a database via the image capturing apparatus 100. In a scene in which an object such as a ball or a player during the event exists, a foreground as the object is separated by image processing, and held as foreground image data.

As a method of separating a foreground as an object, object extraction image processing of, for example, extracting a difference with respect to a background image is used.

Note that the foreground may be not only a player during an event but also another specific person (substitute, coach, and/or referee), or may be an object such as a ball or goal with a predetermined image pattern. As another detection method, a moving body may be detected.

The image generating apparatus 101 accepts, from the terminal 102, the virtual camera control information as information about the position and/or line-of-sight direction of a viewpoint for generating a virtual viewpoint image. A virtual viewpoint image corresponding to the virtual viewpoint information designated by the virtual camera control information is generated from the foreground image data and the background image data managed in the database. As a method of generating a virtual viewpoint image, for example, MBR (Model-Based Rendering) is used. MBR is a method of generating a virtual viewpoint image using a three-dimensional model generated based on a plurality of captured images obtained by capturing an object from a plurality of directions. More specifically, MBR is a technique of generating, as an image, the appearance of a scene from a virtual viewpoint using the three-dimensional shape (model) of the target scene obtained by a three-dimensional shape reconstruction method such as the volume intersection method or MVS (Multi-View-Stereo). Note that as the virtual viewpoint image generation method, another rendering method such as image-based rendering other than MBR may be used. The image generating apparatus 101 transmits the generated and obtained virtual viewpoint image to the terminals 102 and 105 via the LAN cable.

The terminal 102 accepts an operation by the virtual cameraman for movement of the virtual viewpoint, the capturing direction, or the like using a connected controller 104, and converts the operation information into audience virtual camera control information, thereby transmitting the converted information to the image generating apparatus 101 via the LAN cable. The terminal 102 accepts, from the user, information about the position and/or line-of-sight direction of a viewpoint for generating a virtual viewpoint image, and notifies the image generating apparatus 101 of the accepted information. By displaying, on a display screen 103 of the terminal 102, the virtual viewpoint image received from the image generating apparatus 101, the virtual cameraman can view a content at the viewpoint based on the operation, and operate the virtual camera. In some cases, virtual viewpoint images can be stored in time series to create one moving image file.

The terminal 105 receives an instruction from the monitor via a connected controller 107. More specifically, the terminal 105 accepts an operation of the monitoring virtual camera by the monitor for movement of a monitoring virtual viewpoint, a capturing direction, monitoring virtual viewpoint mode, or the like. There are four monitoring virtual viewpoint modes according to the embodiment, that is, an overall bird's-eye monitoring mode, a prediction monitoring mode, a low-quality region monitoring mode, and a camera operation input monitoring mode. The meaning of each mode is as follows.

Overall bird's-eye monitoring mode:
a mode of comprehensively monitoring the entire region where an object can exist
Prediction monitoring mode:
a mode of predicting and monitoring in advance a position to which the audience virtual camera is to move
Low-quality region monitoring mode:
a mode of mainly monitoring a region where the quality of the virtual camera image readily degrades
Camera operation input monitoring mode:
a mode of monitoring by operating the monitoring virtual camera The controller 107 includes buttons each for determining the monitoring virtual viewpoint mode. If the monitor presses the button of the desired mode of the controller 107, the terminal 105 transmits, to the image generating apparatus 101, information (to be referred to as monitoring virtual viewpoint mode information hereinafter) corresponding to the button. If the monitoring virtual viewpoint mode is a camera operation input monitoring mode, the terminal 105 accepts movement and direction information by the operation of the controller 107 by the monitor, converts the operation information into monitoring virtual camera control information, and transmits the converted information to the image generating apparatus 101 via the LAN cable or the like. When the terminal 105 displays, on the monitoring terminal screen 106, the virtual viewpoint image received from the image generating apparatus 101, the monitor can see the monitoring virtual camera viewpoint image to confirm the quality of the image.

Each of the terminals 102 and 105 is, for example, a PC (Personal Computer) or a tablet. Each of the controllers 104 and 107 is, for example, a mouse, a keyboard, a 6-axis controller, a touch panel, or a combination thereof. Each of the virtual cameraman and monitor performs an operation using the controller 104 or 107, thereby displaying a still image or moving image on the screen.

Figure 20:
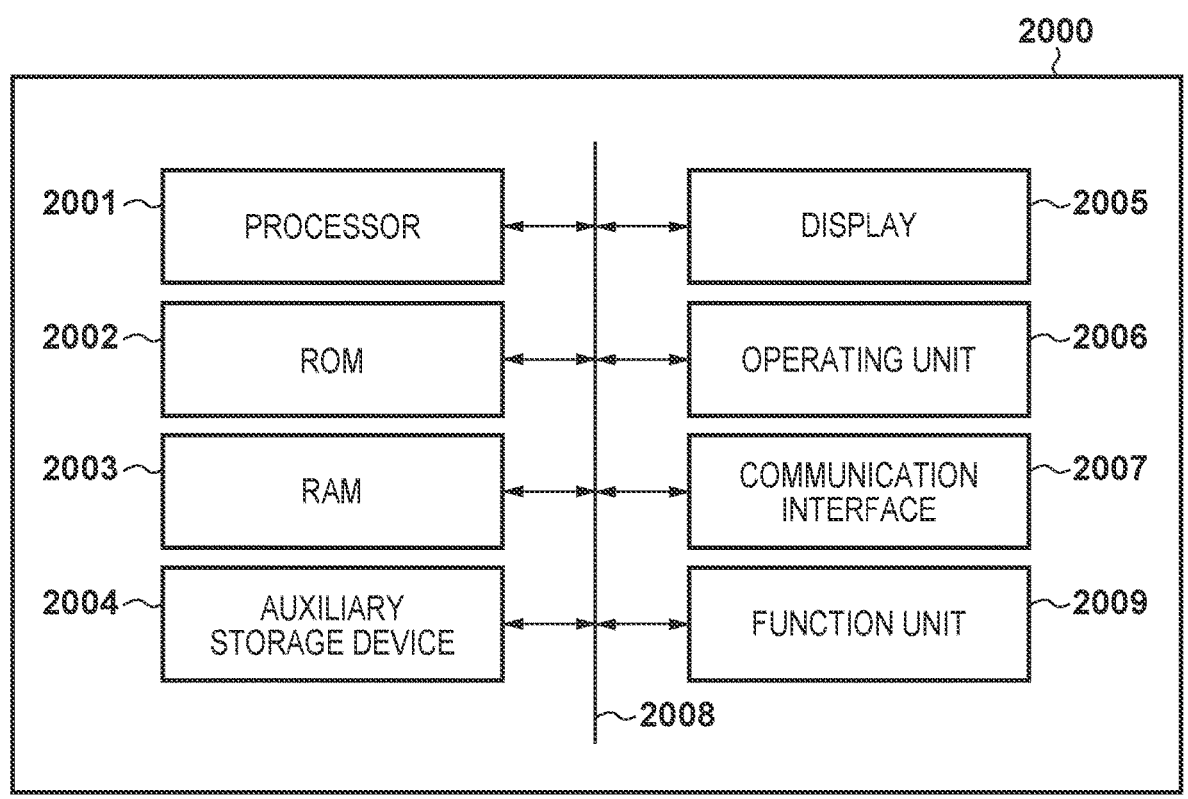
FIG. 20 is a block diagram showing an information processing apparatus according to the embodiment.

Subsequently, the hardware arrangement of each apparatus of the image processing system according to this embodiment will be described with reference to FIG. 20. Referring to FIG. 20, an apparatus 2000 is each apparatus (each of the image capturing apparatus 100, the image generating apparatus 101, and the terminals 102 and 105) of the image capturing system. The apparatus 2000 includes a processor 2001, a ROM 2002, a RAM 2003, an auxiliary storage device 2004, a display 2005, an operating unit 2006, a communication interface 2007, a bus 2008, and a function unit 2009.

The processor 2001 controls the overall apparatus 2000. Note that an example of the processor 2001 may be a CPU. The processor 2001 controls the overall apparatus 2000 using computer programs and data stored in the ROM 2002 and the RAM 2003. Furthermore, the processor 2001 may be an ASIC or FPGA.

The ROM 2002 is a memory storing programs and parameters that need not be changed. The RAM 2003 is a memory for temporarily storing programs and data supplied from the auxiliary storage device 2004 and data externally supplied via the communication interface 2007. The auxiliary storage device 2004 is, for example, a memory that is formed by a hard disk drive or the like and stores content data such as a still image and a moving image.

The display 2005 is formed by, for example, a liquid crystal display, and displays a GUI (Graphical User Interface) and various kinds of information. The operating unit 2006 is formed by, for example, a keyboard and a mouse, and accepts an operation by the user and inputs various instructions to the processor 2001. The communication interface 2007 communicates with an external apparatus. For example, the communication interface 2007 may perform wired or wireless communication. When performing wired communication, the communication interface 2007 serves as hardware for Ethernet. When performing wireless communication, the communication interface 2007 is formed by, for example, a circuit, chip, and antenna for performing communication complying with the IEEE802.11 standard. The bus 2008 connects the respective units to transmit information. The function unit 2009 is hardware for implementing a predetermined function. If the apparatus 2000 serves as the image capturing apparatus 100, the function unit 2009 can be an image capturing unit for capturing an image. The image capturing unit is formed by a lens, an image sensor, an image processing processor, and the like. In the above arrangement, the processor 2001 causes the apparatus 2000 to function as one of the image capturing apparatus 100, the image generating apparatus 101, and the terminals 102 and 105 in the image processing system by executing a dedicated program.

Figure 4:
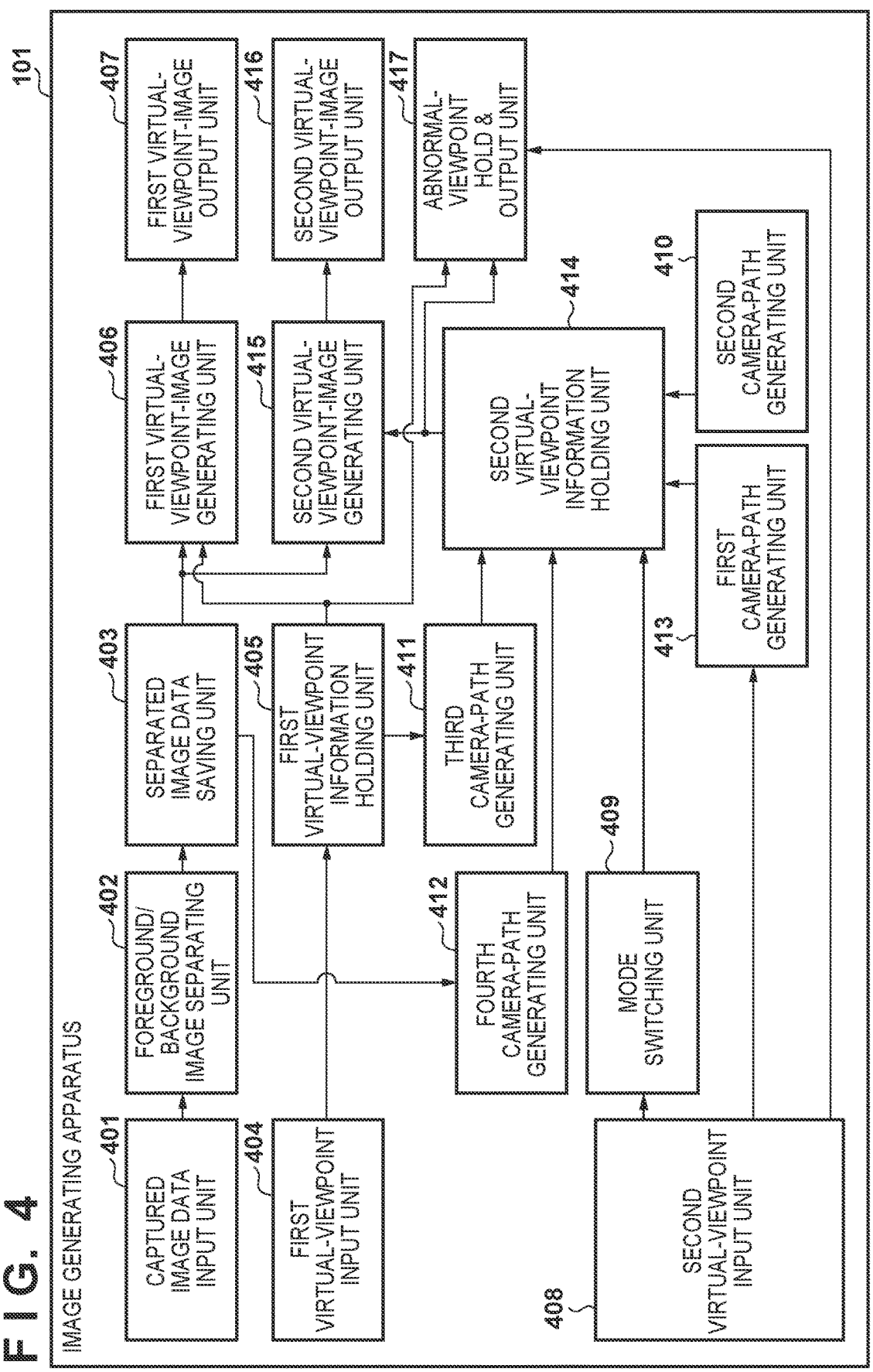
FIG. 4 is a functional block diagram showing an image generating apparatus according to the first embodiment.

The function of the image generating apparatus 101 will be described next. FIG. 4 is a functional block diagram showing the image generating apparatus 101 according to the first embodiment. Respective function units shown in FIG. 4 are implemented when the processor 2001 loads and executes programs to control hardware and calculation and processing of information. However, some of the function units may be implemented by hardware such as an ASIC or FPGA, as a matter of course.

A captured image data input unit 401 converts, into captured image data, transmission signals input from the plurality of image capturing apparatuses 100 via the LAN cable, and supplies the data to a foreground/background image separating unit 402. The foreground/background image separating unit 402 outputs in advance, to a separated image data saving unit 403, as background image data, an image obtained by capturing a scene of an arena in a state in which no object (no player or ball) exists, for example, before an event starts, among the captured images from the captured image data input unit 401, and holds the data in the separated image data saving unit 403. The foreground/background image separating unit 402 extracts an object such as a player from an image captured during the event, and outputs the object as foreground image data to the separated image data saving unit 403.

The separated image data saving unit 403 is a database, and saves, as background image data, an image captured in advance in a state in which no object exists, among captured image data input from the foreground/background image separating unit 402. The separated image data saving unit 403 saves, as foreground image data, difference data between the background image data and captured image data including the object. Furthermore, in response to a separated image acquisition instruction from a first virtual-viewpoint-image generating unit 406, the separated image data saving unit 403 outputs the designated background image data and foreground image data to the first virtual-viewpoint-image generating unit 406. In response to a separated image acquisition instruction from a second virtual-viewpoint-image generating unit 415, the separated image data saving unit 403 outputs the designated background image data and foreground image data to the second virtual-viewpoint-image generating unit 415.

A first virtual-viewpoint input unit 404 converts, into predetermined input information, a transmission signal input from the terminal 102 via the LAN cable. If the input information is audience virtual camera control information, the first virtual-viewpoint input unit 404 outputs the audience virtual camera control information to a first virtual-viewpoint information holding unit 405.

The first virtual-viewpoint information holding unit 405 performs conversion into virtual viewpoint information based on the virtual camera control information input from the first virtual-viewpoint input unit 404, and outputs the virtual viewpoint information to the first virtual-viewpoint-image generating unit 406. The virtual viewpoint information is generated and output at an interval of 1/60 sec.

The first virtual-viewpoint-image generating unit 406 acquires, from the separated image data saving unit 403, the foreground image data and background image data corresponding to the virtual viewpoint information input from the first virtual-viewpoint information holding unit 405. Furthermore, the first virtual-viewpoint-image generating unit 406 generates a virtual viewpoint image by combining the acquired foreground image data and background image data by image processing, and outputs the generated image to a first virtual-viewpoint-image output unit 407. Note that the processing of inputting the virtual viewpoint information and generating and outputting the virtual viewpoint image is executed at an interval of 1/60 sec.

The first virtual-viewpoint-image output unit 407 functions as an image transmission unit, and converts the virtual viewpoint image input from the first virtual-viewpoint-image generating unit 406 into a transmission signal transmittable to the terminal 102 and outputs the signal to the terminal 102. Note that the virtual viewpoint image is output at an interval of 1/60 sec, and the terminal 102 displays the audience virtual viewpoint image at a frame rate of 60 fps.

A second virtual-viewpoint input unit 408 converts, into predetermined input information, a transmission signal input from the terminal 105 via the LAN cable. If the input information is monitoring virtual camera control information, the second virtual-viewpoint input unit 408 outputs the monitoring virtual camera control information to a first camera-path generating unit 413. Alternatively, if the input information is monitoring virtual viewpoint mode information, the second virtual-viewpoint input unit 408 outputs the monitoring virtual viewpoint mode information to a mode switching unit 409. Although details will be described later, if information indicating an abnormal viewpoint is received from the terminal 105, the second virtual-viewpoint input unit 408 notifies an abnormal-viewpoint hold & output unit 417 of it.

If the monitoring virtual viewpoint mode information is input from the second virtual-viewpoint input unit 408, the mode switching unit 409 outputs a virtual viewpoint mode switching instruction to a second virtual-viewpoint information holding unit 414.

Upon receiving the virtual viewpoint mode switching instruction from the mode switching unit 409, the second virtual-viewpoint information holding unit 414 acquires virtual camera path information from one of the first camera-path generating unit 413, a second camera-path generating unit 410, a third camera-path generating unit 411, and a fourth camera-path generating unit 412 in accordance with the information, and generates virtual viewpoint information based on the virtual camera path information. The virtual camera path information is information for determining a space curve equation, a movement start position, and the direction of the virtual camera, all of which indicate a path along which the virtual camera is to move. The space curve equation indicates a spline curve obtained by connecting data points by a spline. Note that as the space curve equation, a method other than spline processing, for example, an approximate line method of data points by a least-squares method may be used. Since the virtual camera path information used in this embodiment exists for each piece of monitoring virtual viewpoint mode information, there are a plurality of kinds of virtual camera path information. Details will be described in an explanation of each camera path generating unit. After that, the second virtual-viewpoint information holding unit 414 outputs the virtual viewpoint information to the second virtual-viewpoint-image generating unit 415. The virtual viewpoint information is generated and output at an interval of 1/60 sec.

The second virtual-viewpoint-image generating unit 415 acquires, from the separated image data saving unit 403, the foreground image data and background image data corresponding to the virtual viewpoint information input from the second virtual-viewpoint information holding unit 414. Furthermore, the second virtual-viewpoint-image generating unit 415 generates a virtual viewpoint image by combining the acquired foreground image data and background image data by image processing, and outputs the combined virtual viewpoint image to a second virtual-viewpoint-image output unit 416. Note that the processing of inputting the virtual viewpoint information and generating and outputting the virtual viewpoint image is executed at an interval of 1/60 sec.

The second virtual-viewpoint-image output unit 416 converts, into a transmission signal transmittable to the terminal 105, the monitoring virtual viewpoint image input from the second virtual-viewpoint-image generating unit 415, and outputs the signal to the terminal 105. Note that the virtual viewpoint image is output at an interval of 1/60 sec, and the terminal 105 displays the monitoring virtual viewpoint image at a frame rate of 60 fps.

The abnormal-viewpoint hold & output unit 417 includes an internal memory for storing a plurality of pieces of abnormal viewpoint information. Before the terminals 102 and 105 in the system according to the embodiment function, the internal memory is initialized to a state in which the abnormal viewpoint information is unregistered. When an abnormal viewpoint occurrence notification is received from the second virtual-viewpoint input unit 408, the abnormal-viewpoint hold & output unit 417 registers, in the internal memory, information (held in the second virtual-viewpoint information holding unit 414) indicating the current position and line-of-sight direction of the monitoring virtual viewpoint.

Note that there is a time difference from when the monitor inputs information indicating an abnormality to the terminal 105 until the abnormal-viewpoint hold & output unit 417 registers the position and orientation of the abnormal viewpoint in the internal memory. Since, however, an abnormal virtual viewpoint image is generated not instantaneously, for example, for 1/60 sec but continuously for a certain period, no problem arises by performing the above control processing. To perform strict control, when generating a virtual viewpoint image, the virtual viewpoint image is added with a unique identification number and then transmitted. The terminal 105 identifies the identification number of the virtual image when the monitor issues an abnormality display instruction, thereby notifying the image generating apparatus 101 of the abnormality.

The abnormal-viewpoint hold & output unit 417 acquires, from the first virtual-viewpoint information holding unit 405, information indicating the position and line-of-sight direction of the audience virtual viewpoint at the timing of generating an audience virtual viewpoint image (at a period of 1/60 sec in this embodiment). The abnormal-viewpoint hold & output unit 417 superimposes, on a graphic imitating a soccer field, the first type of camera icon corresponding to the current position and line-of-sight direction of the audience virtual viewpoint and the second type of camera icon corresponding to the position and line-of-sight direction of the abnormal viewpoint registered in the internal memory. The first and second types of camera icons have different colors to be displayed in a form in which these icons can be readily identified. If no abnormal viewpoint is registered in the internal memory at the start of the operation of the system or the like, only the first type of camera icon is superimposed on the graphic of the soccer field. If a plurality of abnormal viewpoints are registered in the internal memory, a plurality of camera icons of the second type are superimposed on the graphic of the soccer field. Then, the abnormal-viewpoint hold & output unit 417 transmits, to the terminal 102, the graphic of the soccer field on which the camera icons are superimposed.

Figure 5:
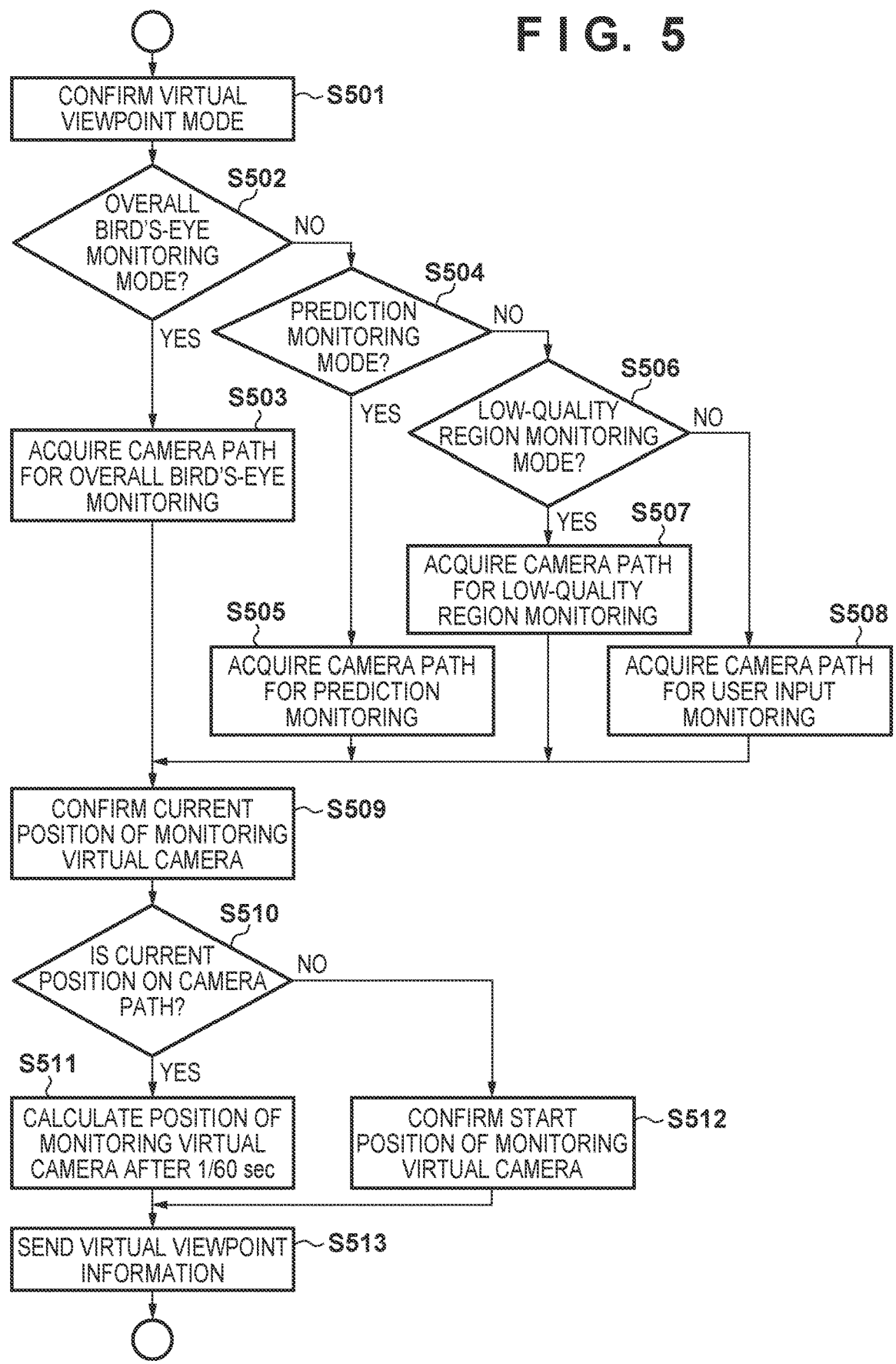
FIG. 5 is a flowchart illustrating control of a second virtual-viewpoint information holding unit according to the first embodiment.

The operation of the second virtual-viewpoint information holding unit 414 will be described next. FIG. 5 is a flowchart illustrating the operation of the second virtual-viewpoint information holding unit 414 according to the first embodiment.

The second virtual-viewpoint information holding unit 414 confirms the current monitoring virtual viewpoint mode (step S501). If the monitoring virtual viewpoint mode is the overall bird's-eye monitoring mode (YES in step S502), the second virtual-viewpoint information holding unit 414 acquires virtual camera path information for overall bird's-eye monitoring from the second camera-path generating unit 410 (step S503). The overall bird's-eye monitoring mode is a mode of comprehensively monitoring the entire region where an object can exist, as described above.

If the monitoring virtual viewpoint mode is the prediction monitoring mode (YES in step S504), the second virtual-viewpoint information holding unit 414 acquires virtual camera path information for prediction monitoring from the third camera-path generating unit 411 (step S505). The prediction monitoring mode is a mode of predicting a position to which the audience virtual camera is to move and monitoring it, as described above.

If the monitoring virtual viewpoint mode is the low-quality region monitoring mode (YES in step S506), the second virtual-viewpoint information holding unit 414 acquires virtual camera path information for low-quality region monitoring from the fourth camera-path generating unit 412 (step S507). The low-quality region monitoring mode is a mode of mainly monitoring a region where the quality of the virtual camera image readily degrades, as described above. Note that there may be a plurality of low-quality regions. In this case, virtual camera path information for low-quality region monitoring, which is included in the monitoring virtual viewpoint mode information and complies with information for defining a region selected by the monitor, is acquired.

If the monitoring virtual viewpoint mode is the camera operation input monitoring mode (NO in step S506), the second virtual-viewpoint information holding unit 414 acquires virtual camera path information for camera operation input monitoring from the first camera-path generating unit 413 (step S508). The camera operation input monitoring mode is a mode of monitoring by operating the monitoring virtual camera by the monitor.

The monitoring virtual camera path information in each monitoring virtual viewpoint mode will be described below.

Figure 6A:
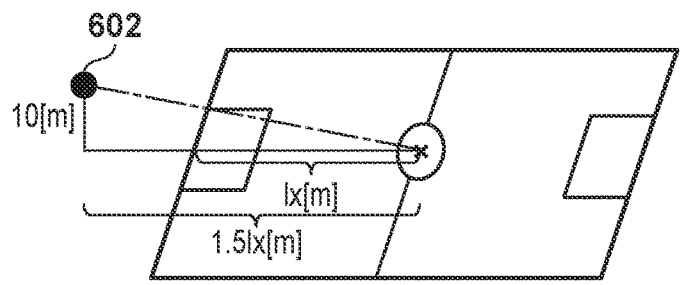
FIGS. 6A to 6D are views for explaining a method of generating an overall bird's-eye monitoring camera path according to the first embodiment.

FIGS. 6A to 6D are views for explaining a method of generating an overall bird's-eye monitoring camera path by the second camera-path generating unit 410. An overall bird's-eye monitoring path 601 indicates a path along which the monitoring virtual camera moves from a movement start position 602. In FIG. 6A, the position of the movement start position 602 is determined. First, the second camera-path generating unit 410 detects a region where an object may exist. In this example, a region indicated by the outer line of the soccer field corresponds to the region. Next, when lx represents a distance from a field central position 603 to the intersection point of the X-axis and the outer line of the field in the negative direction of the X-axis, a distance obtained by multiplying lx by 1.5 from the field central position 603 in the negative direction of the X-axis is determined, and a position of 10 m from there in the positive direction of the Z-axis is set as the movement start position 602. Note that these numerical values may be set or selected appropriately by the administrator in accordance with the type of event.

Figure 6B:
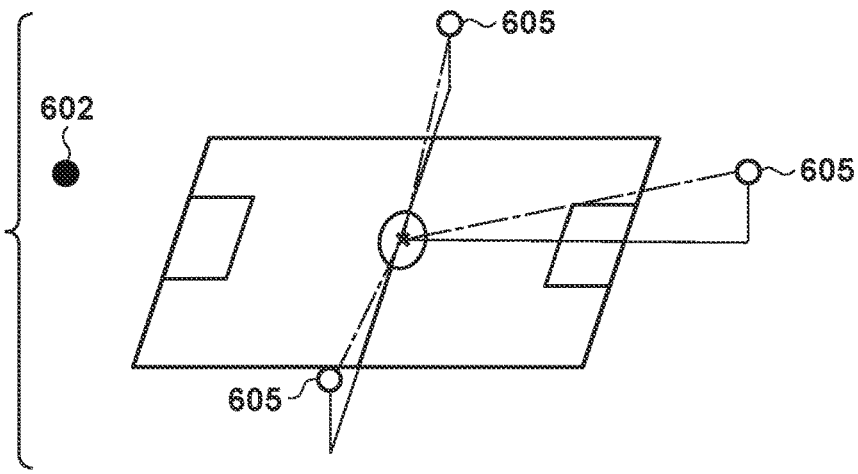

FIG. 6B shows, as monitoring virtual camera positions, monitoring virtual camera positions 605 for the positive direction of the Y-axis, the positive direction of the X-axis, and the negative direction of the Y-axis. Four monitoring virtual camera positions can be detected.

Figure 6C:
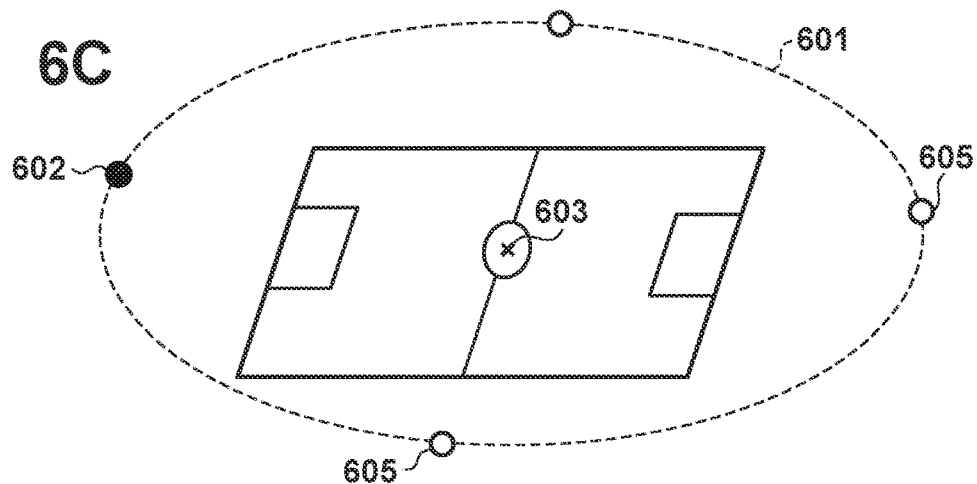

FIG. 6C shows the space curve 601 as a curve connecting the four points obtained in FIG. 6B by the spline processing. This curve is determined as the movement path (camera path) of the monitoring virtual camera.

Figure 6D:
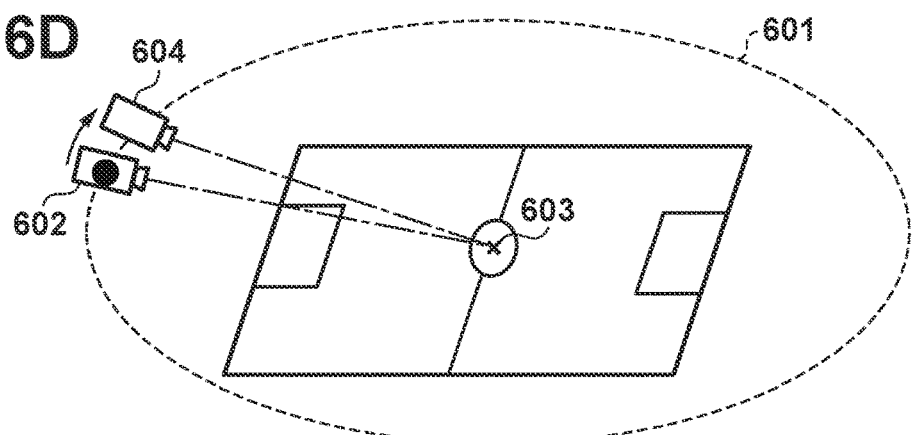

FIG. 6D is a view for explaining the direction and movement of the monitoring virtual camera. Setting is made so that the direction of the viewpoint of the monitoring virtual camera is always set to the field central position 603. By using the camera path, the region where the object may exist, that is, the so-called entire soccer field can be monitored from all directions. The second camera-path generating unit 410 sets the viewpoint position of the monitoring camera at the predetermined start position on the overall bird's-eye monitoring path 601 while setting the direction of the capturing viewpoint to the field central position 603, moves the virtual viewpoint in the preset direction along the overall bird's-eye monitoring path 601 at a predetermined speed, and outputs information indicating the position and line-of-sight direction of the virtual viewpoint to the second virtual-viewpoint information holding unit 414 every time.

Figure 7A:
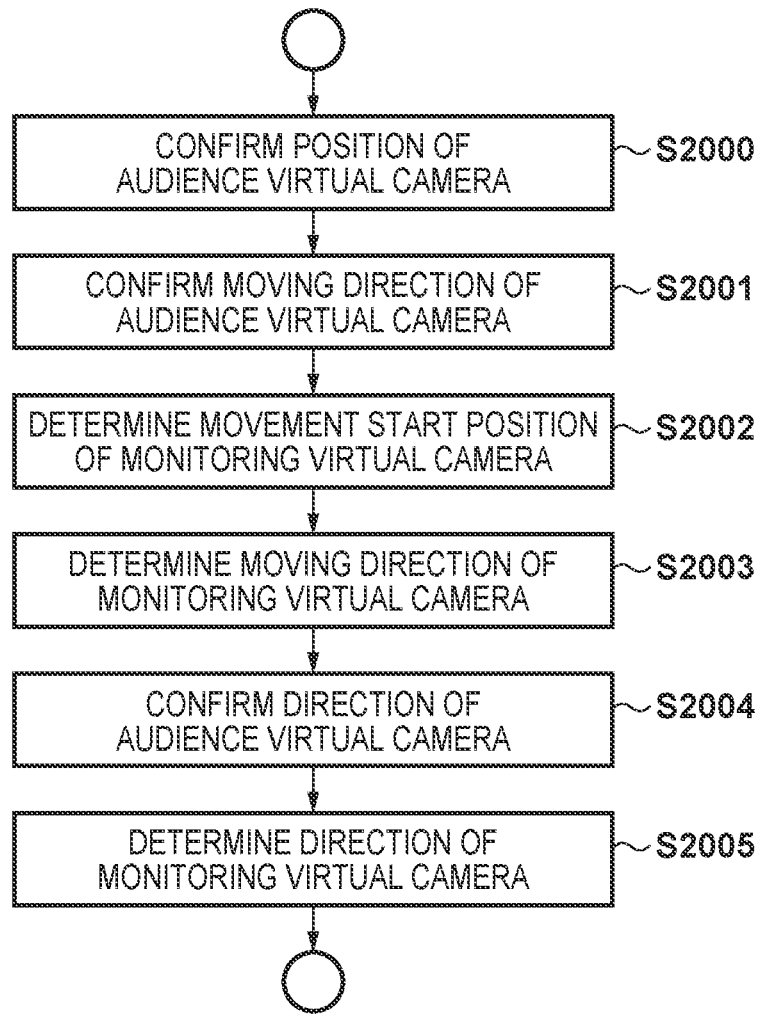
FIGS. 7A and 7B are a flowchart and a view for explaining a method of generating a prediction monitoring camera path according to the first embodiment.
Figure 7B:
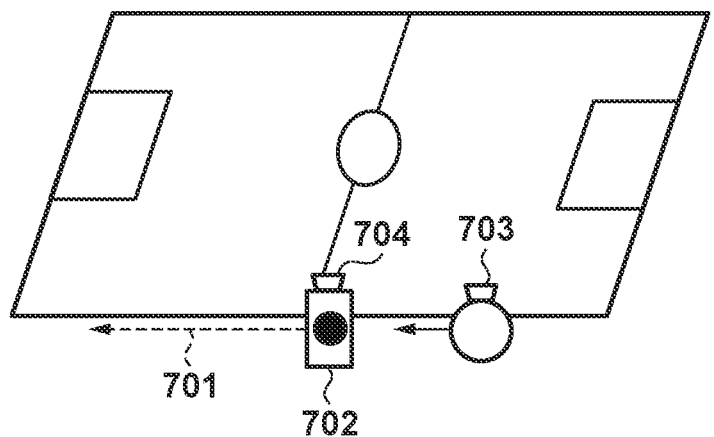

FIGS. 7A and 7B are a flowchart and a view for explaining a method of generating a prediction monitoring camera path by the third camera-path generating unit 411.

FIG. 7A is a flowchart illustrating control of the third camera-path generating unit 411. The third camera-path generating unit 411 acquires virtual viewpoint information from the first virtual-viewpoint information holding unit 405 and confirms the position of the audience virtual camera (step S2000). The third camera-path generating unit 411 confirms the past position of the audience virtual camera from virtual viewpoint information acquired last time, and estimates the extension direction of the position as the subsequent moving direction of the audience virtual camera (step S2001).

The third camera-path generating unit 411 determines, as the movement start position of the monitoring virtual camera, a position of 10 m ahead in the estimated direction from the current position of an audience virtual camera 703 (step S2002). Furthermore, the third camera-path generating unit 411 estimates a path from the movement start position in the moving direction as a camera path along which the monitoring virtual camera moves (step S2003). The third camera-path generating unit 411 confirms the direction of the audience virtual camera (step S2004), and determines the direction of the monitoring virtual camera to be the same as that of the audience virtual camera (step S2005). Note that a method other than the above-described method may be used as long as it is possible to predict the future position of the audience virtual camera.

FIG. 7B is a conceptual view showing the movement of the prediction monitoring camera path. A predicted monitoring path 701 indicates a path along which a monitoring virtual camera 704 moves from a movement start position 702. The audience virtual camera 703 is at a position shown in FIG. 7B, and the moving direction is the positive direction of the X-axis, and the direction of the audience virtual camera 703 is the positive direction of the Y-axis. In this case, the movement start position 702 of the monitoring virtual camera 704 is set to a position of 10 m ahead in the positive direction of the X-axis from the position of the audience virtual camera 703, and the moving direction of the monitoring virtual camera is set to the positive direction of the X-axis. The direction of the monitoring virtual camera is the positive direction of the Y-axis which is the same as the direction of the audience virtual camera. A path from the movement start position 702 in the positive direction of the X-axis is determined as the predicted monitoring path 701.

The third camera-path generating unit 411 outputs, as the monitoring virtual camera path information, a space curve equation indicating the thus set predicted monitoring path 701 to the second virtual-viewpoint information holding unit 414.

Note that the predicted monitoring path 701 is determined based on the moving direction and current position of the audience virtual camera 703, as described above. Therefore, every time the current position of the audience virtual camera 703 is updated, the predicted monitoring path 701 is also updated.

A method of generating a low-quality region monitoring camera path by the fourth camera-path generating unit 412 will be described with reference to FIGS. 8A to 8F.

Figure 8A:
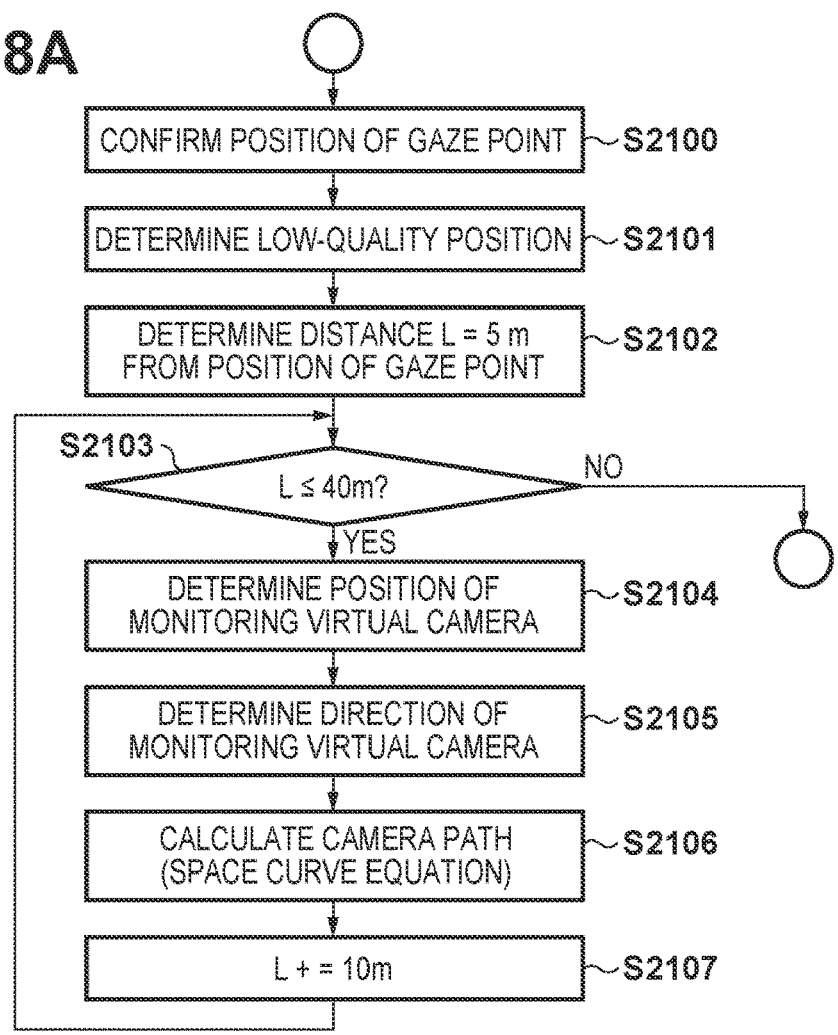
FIGS. 8A to 8F are a flowchart and views for explaining a method of generating a low-quality region monitoring camera path according to the first embodiment.

FIG. 8A is a flowchart illustrating processing contents of the fourth camera-path generating unit 412. The fourth camera-path generating unit 412 confirms the position of a preset gaze point 803 (see FIG. 8B) (step S2100). The gaze point 803 indicates a position gazed particularly. In the embodiment, since a soccer event is exemplified, a position in front of a goal corresponds to the position. Assume that the central positions of captured images of a preset number of image capturing apparatuses 100 among all the image capturing apparatuses 100 are set as the gaze points 803. Note that in the case of soccer, there are two goals, and thus the monitor selects one of the goals. If the monitor makes selection, the terminal 105 includes information for identifying the selected gaze point 803 in the monitoring virtual viewpoint mode information and transmits the monitoring virtual viewpoint mode information to the image generating apparatus 101. Note that the positions and the number of viewpoints depend on an event and the like. If there is one gaze point, selection by the monitor is unnecessary.

Figure 8B:
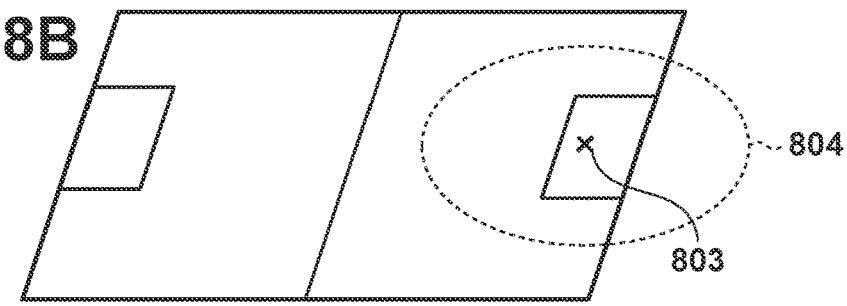

The quality of the virtual viewpoint image by the virtual camera is higher in a region where an image region captured by the actual image capturing apparatus 100 overlaps that captured by another image capturing apparatus 100, and is lower in a region where the regions do not overlap each other. FIG. 8B will be exemplified. In this case, a virtual viewpoint image captured by the virtual camera has higher quality near the gaze point 803, and has lower quality in a far place, that is, a so-called lower-quality region farther away from the gaze point.

The fourth camera-path generating unit 412 determines a low-quality position to determine a region to be displayed on the monitoring virtual camera image, that is, the direction of the virtual camera (step S2101). The low-quality position is on a circle separated from the gaze point 803 by 20 m on the XY plane, and corresponds to a circle 804 shown in FIG. 8B. Note that a method of determining a low-quality position may be a method other than the above-described one, and is not specifically limited.

The fourth camera-path generating unit 412 determines a distance L from the gaze point 803 on the XY plane (step S2102). The initial value of the distance L is 5 m. After that, a position of Z=10 m on a circle separated from the gaze point 803 by the distance L on the XY plane is determined as a monitoring virtual camera path 801 (step S2104). Furthermore, the intersection point of the monitoring virtual camera path 801 and the negative direction of the X-axis from the gaze point 803 is determined as a movement start position 802. Therefore, a monitoring virtual camera 800 moves clockwise from the movement start position 802 on the monitoring virtual camera path 801. After that, the fourth camera-path generating unit 412 calculates a space curve equation by performing spline processing for the derived monitoring virtual camera path 801, and determines it as a monitoring virtual camera path (step S2105).

Figure 8C:
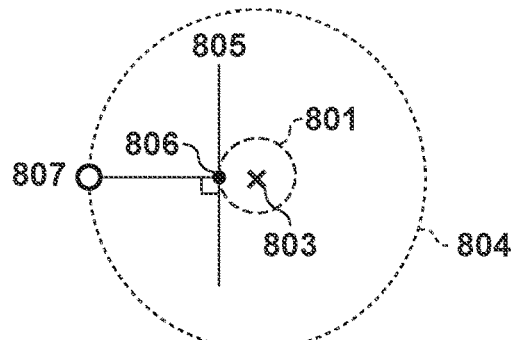
Figure 8D:
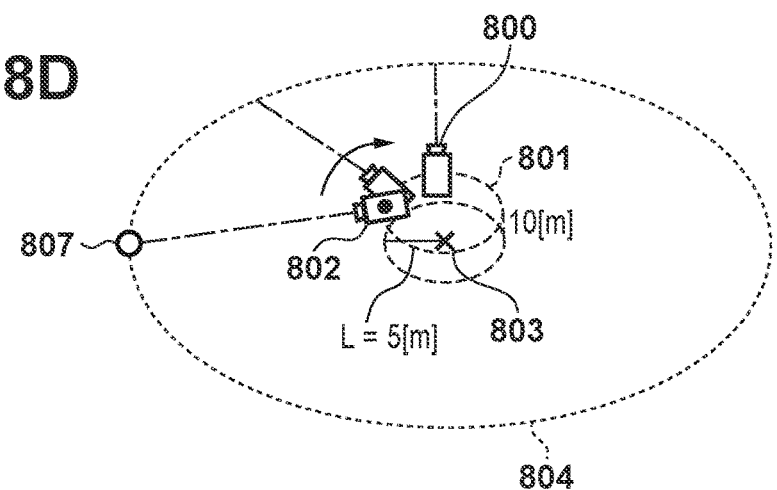

The fourth camera-path generating unit 412 determines the direction of the monitoring virtual camera 800 (step S2106). FIG. 8C is a view for explaining a method of determining the direction of the camera when the virtual camera is at the movement start position 802. First, the fourth camera-path generating unit 412 obtains a perpendicular 806 to a tangent 805 of the circle on the XY plane of the monitoring virtual camera path 801. After that, the fourth camera-path generating unit 412 derives an intersection point 807 with the movement start position 802. The fourth camera-path generating unit 412 determines the direction of the virtual camera so that the intersection point 807 is set at the center of the monitoring virtual camera image. FIG. 8D is a conceptual view showing a monitoring camera path when distance L=5 m. This camera path provides a monitoring image when the camera is directed from inward to outward of the soccer field.

After that, the fourth camera-path generating unit 412 adds 10 m to the distance L to obtain a new monitoring virtual camera path (step S2107). Therefore, the distance L is set to 40 m at maximum (YES in step S2103). If the distance L exceeds 40 m, the camera path generation processing ends (NO in step S2103). Therefore, in this example, four camera paths are generated for the distances L of 5 m, 15 m, 25 m, and 35 m, respectively.

Figure 8E:
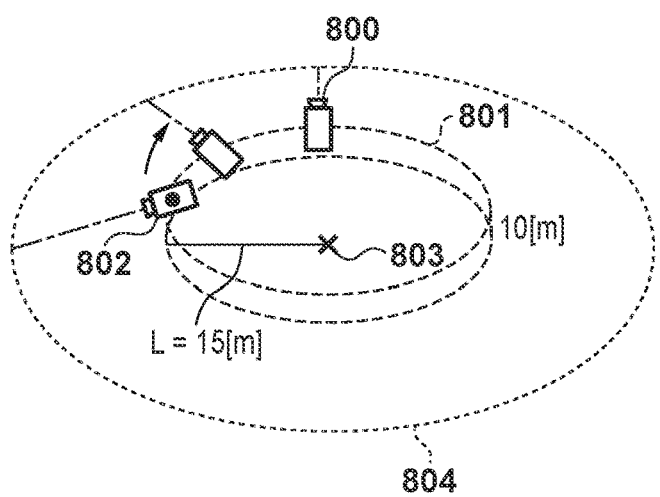
Figure 8F:
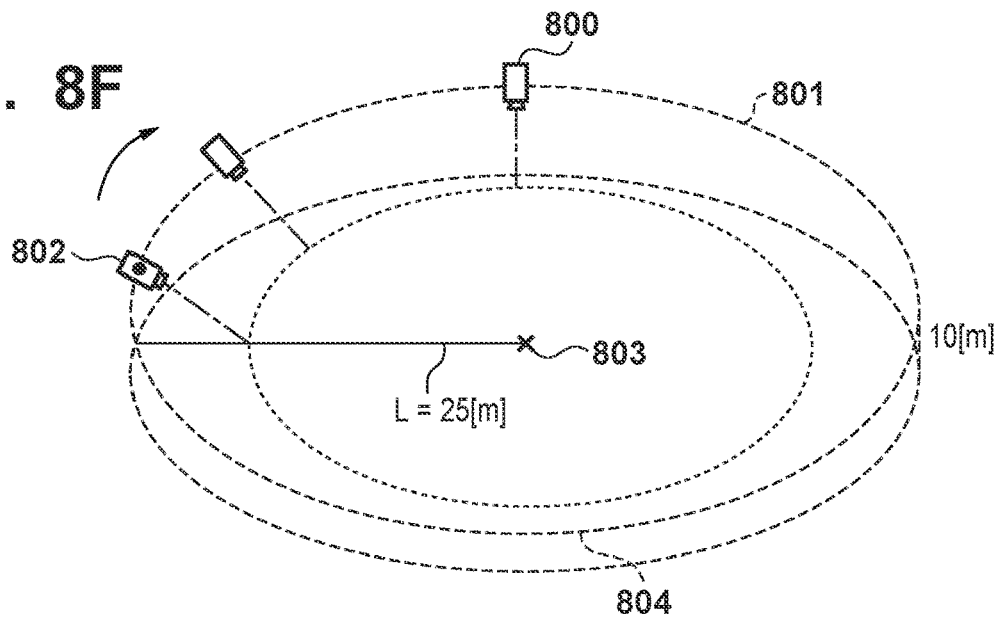

FIG. 8E is a conceptual view showing the monitoring virtual camera path when the distance L is 15 m. FIG. 8F is a conceptual view showing the monitoring virtual camera path when the distance L is 25 m. If the distance L is 25 m, a monitoring image obtained when the camera is directed from outward to inward of the soccer field is used.

Note that the value of the distance L when a monitoring virtual camera path is obtained may be a value other than the above-described ones and is not specifically limited. The fourth camera-path generating unit 412 outputs, to the second virtual-viewpoint information holding unit 414, as virtual camera path information, the space curve equation indicating the thus set low-quality region monitoring path 601.

Figure 9:
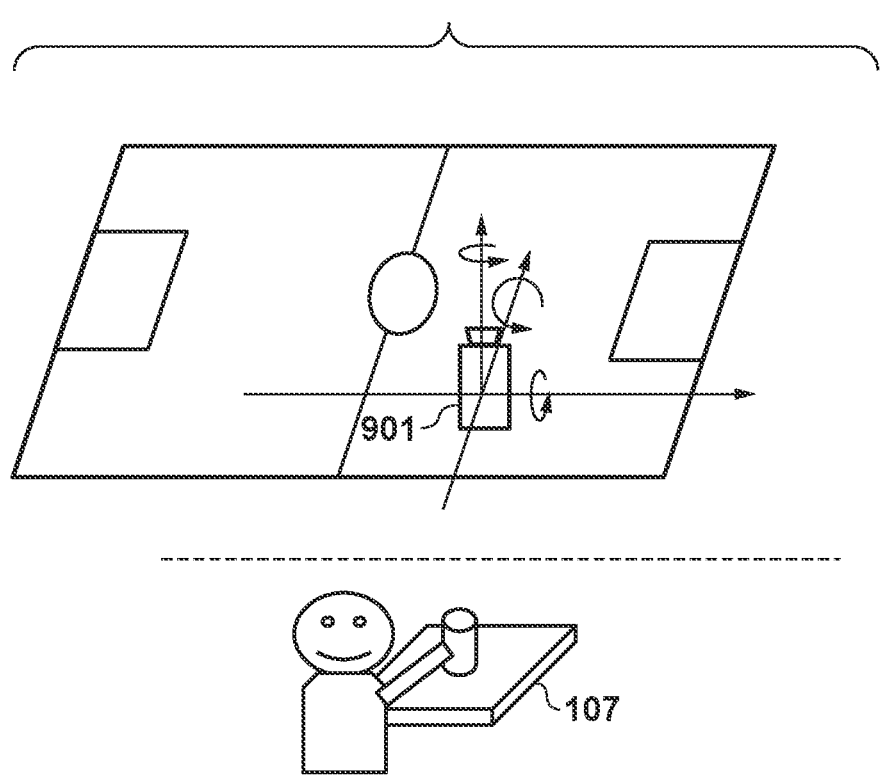
FIG. 9 is a conceptual view showing a camera operation input monitoring camera path according to the first embodiment.

FIG. 9 is a conceptual view showing the camera operation input monitoring camera path. The monitor changes the movement and direction of a monitoring virtual camera 901 using the controller 107 connected to the terminal 105. The second virtual-viewpoint input unit 408 outputs, to the first camera-path generating unit 413, the monitoring virtual camera control information acquired from the terminal 105. The first camera-path generating unit 413 generates virtual camera path information based on the monitoring virtual camera control information, and outputs it to the second virtual-viewpoint information holding unit 414.

As is apparent from the above description, in the overall bird's-eye monitoring mode, the prediction monitoring mode, and the low-quality region monitoring mode of the monitoring virtual viewpoint modes, the image generating apparatus 101 automatically, sequentially updates the viewpoint position of the monitoring virtual camera. In the camera operation input monitoring mode, the monitoring virtual viewpoint is updated depending on the operation of the controller 107 by the monitor.

Referring back to FIG. 5, the second virtual-viewpoint information holding unit 414 acquires virtual camera path information corresponding to the virtual viewpoint mode, and then confirms the current position of the virtual camera (step S509). As a result, it is confirmed whether the current position of the virtual camera is on the acquired virtual camera path.

If the current position is on the path (YES in step S510), the second virtual-viewpoint information holding unit 414 calculates, from the current position of the virtual camera, a position on the path after $\frac{1}{60}$ sec (step S511), and generates virtual viewpoint information of the position and outputs it to the second virtual-viewpoint-image generating unit 415 (step S513).

If the current position is not on the path (NO in step S510), the second virtual-viewpoint information holding unit 414 confirms a movement start position stored in the acquired virtual camera path information (step S512), and generates virtual viewpoint information of the position and outputs it to the second virtual-viewpoint-image generating unit 415 (step S513).

The movement of the monitoring virtual camera (virtual viewpoint) will be described below.

Figures 10A, 10B, 10C:
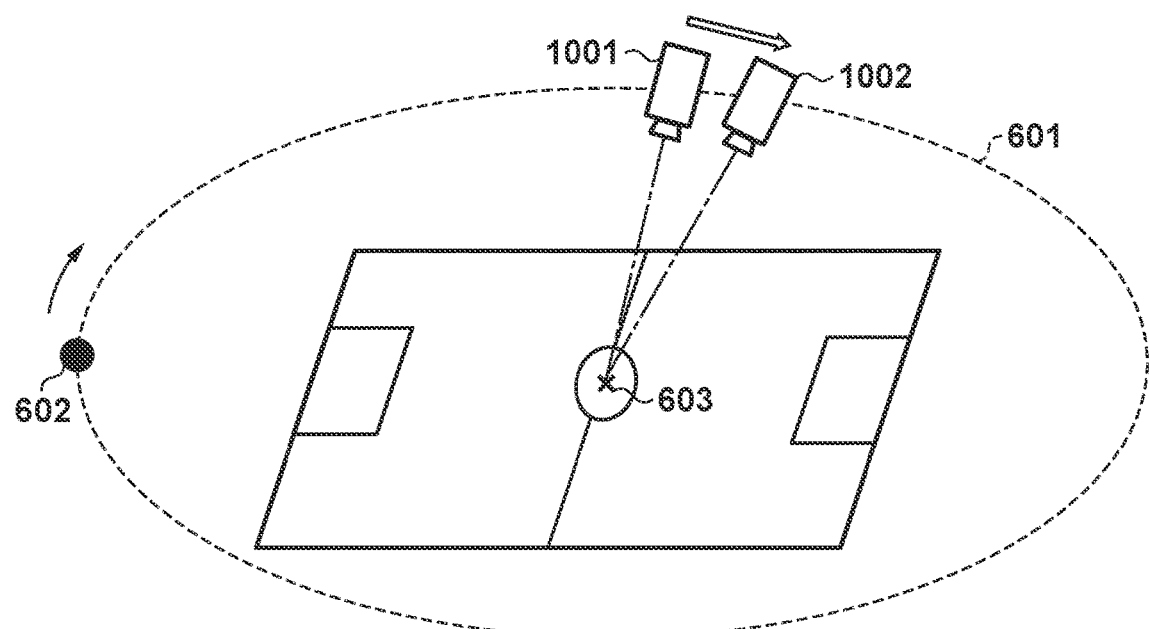
FIGS. 10A to 10C are a view and tables for explaining movement on a camera path according to the first embodiment.

FIG. 10A shows movement when the current position of the monitoring virtual camera is on the virtual camera path. FIG. 10A exemplifies the overall bird's-eye monitoring mode. Referring to FIG. 10A, if it is confirmed that a current monitoring virtual camera 1001 is on the virtual camera path, a position 1002 on the path to which the virtual camera moves from the current position by 100 mm is confirmed to generate virtual viewpoint information. Movement of 100 mm for $\frac{1}{60}$ sec corresponds to about 20 km per hour. Note that the moving distance of the virtual camera is not specifically limited. A portion for inputting a distance from the monitoring terminal screen 106 by the monitor may be provided, and the distance may be input by the monitor to be variably set. FIG. 10B shows the virtual viewpoint information of the virtual camera 1001. FIG. 10C shows the virtual viewpoint information corresponding to the position to which the virtual camera 1001 moves after $\frac{1}{60}$ sec.

Figures 11A, 11B, 11C:
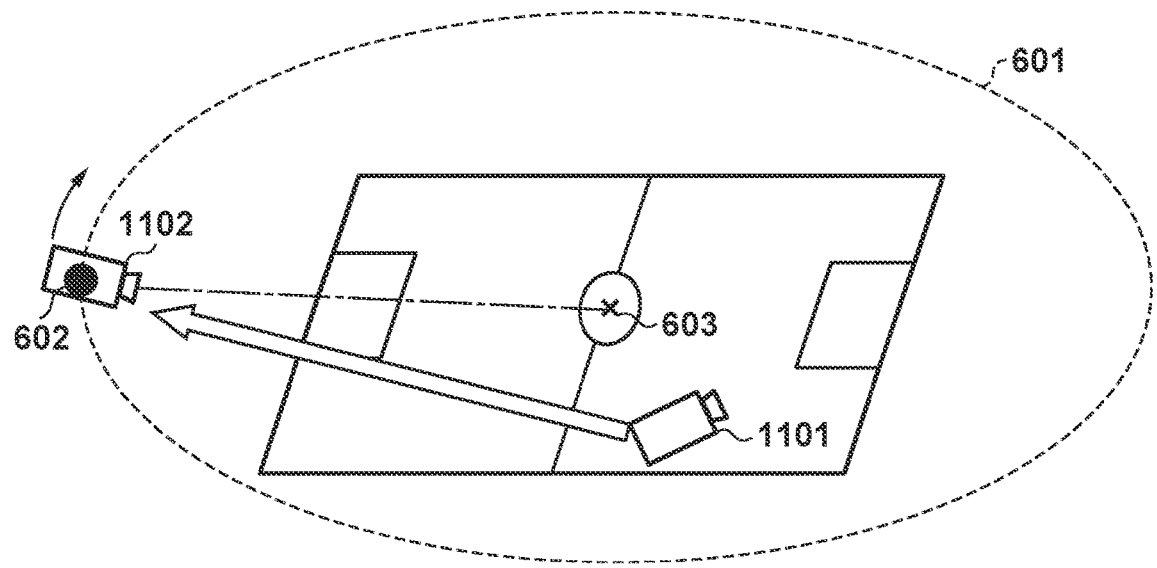
FIGS. 11A to 11C are a view and tables for explaining movement to the initial position of a camera path according to the first embodiment.

Next, movement when the current position of the monitoring virtual camera is not on the virtual camera path will be described. FIG. 11A shows an example when the monitoring virtual viewpoint mode is switched from the camera operation input monitoring mode to the overall bird's-eye monitoring mode. Referring to FIG. 11A, if it is confirmed that a current monitoring virtual camera 1101 is not on the virtual camera path, the acquired start position 602 of the camera path is confirmed to generate virtual viewpoint information. FIG. 11B shows the virtual viewpoint information of the virtual camera 1101. FIG. 11C shows the virtual viewpoint information of a virtual camera 1102 that has moved to the start position 602.

Detailed processing contents when an abnormal virtual viewpoint image is displayed in the terminal 105 according to the embodiment will be described next.

Figure 12A:
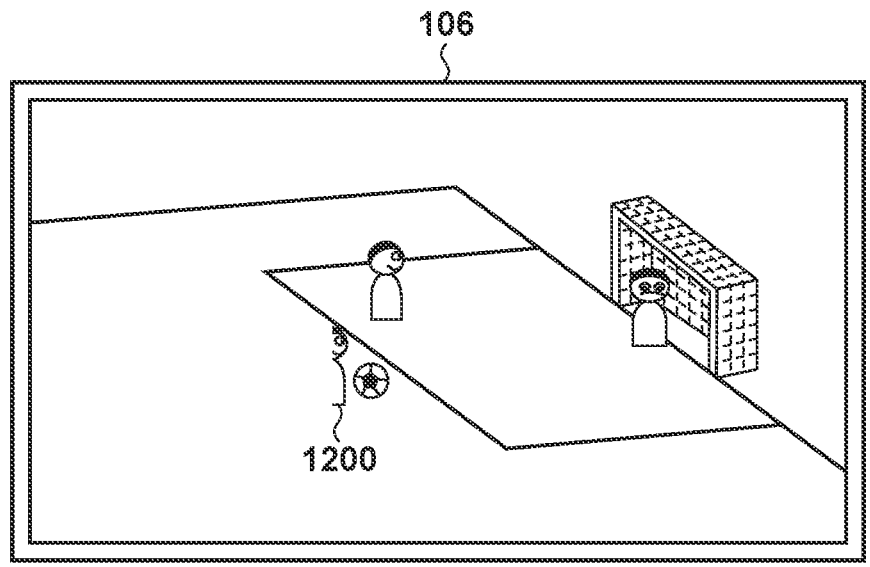
FIGS. 12A and 12B are views each showing a display example of a virtual viewpoint image according to the first embodiment.

FIG. 12A shows a display example on the monitoring terminal screen 106 of the terminal 105. Assume that the monitoring virtual viewpoint mode is the camera operation input monitoring mode. However, another mode may be set. FIG. 12A shows an abnormal state in which a half of the body of a player 1200 is not displayed in a virtual viewpoint image in the position and orientation of the monitoring virtual viewpoint at this time. If the monitor sees the image to recognize it as an abnormal image or a low-quality image, he/she operates the controller 107 to input information indicating that an abnormal viewpoint has occurred. Note that the abnormal viewpoint may be not only in the position and orientation of a virtual viewpoint at which a virtual viewpoint image with a missing foreground is generated but also in the position and orientation of a virtual viewpoint at which a virtual viewpoint image whose quality is determined for another reason is generated, such as the position and orientation of a virtual viewpoint at which a virtual viewpoint image including much noise is generated. If such information is input, the terminal 105 stores the information indicating the abnormal viewpoint in the monitoring virtual camera control information, and notifies the image generating apparatus 101 of it (transmits it to the image generating apparatus 101). That is, the terminal 105 notifies the image generating apparatus 101 of information for designating the position and/or line-of-sight direction of the viewpoint at which a low-quality virtual viewpoint image is generated. Furthermore, the terminal 105 notifies the image generating apparatus 101 of information about the position and orientation of the virtual viewpoint at which a virtual viewpoint image with a missing foreground is generated or the position and orientation of the virtual viewpoint at which a virtual viewpoint image including much noise is generated. The image generating apparatus 101 accepts, from the terminal 105, the information for designating the position and/or line-of-sight direction of the viewpoint at which a low-quality virtual viewpoint image is generated. Furthermore, the image generating apparatus 101 accepts, from the terminal 105, the information about the position and orientation of the virtual viewpoint at which a virtual viewpoint image with a missing foreground is generated or the position and orientation of the virtual viewpoint at which a virtual viewpoint image including much noise is generated. Note that the terminal 105 or the image generating apparatus 101 may be configured to automatically determine the quality of the virtual viewpoint image by executing image processing for evaluating the image quality.

Upon receiving this notification, the second virtual-viewpoint input unit 408 of the image generating apparatus 101 notifies the abnormal-viewpoint hold & output unit 417 that the abnormal viewpoint has occurred. Upon receiving this notification, the abnormal-viewpoint hold & output unit 417 acquires the information of the position and orientation (position and line-of-sight direction) of the monitoring virtual viewpoint at this time from the second virtual-viewpoint information holding unit 414, and registers it as abnormal viewpoint information in the internal memory.

The abnormal-viewpoint hold & output unit 417 generates graphic information of the soccer field on which the first type of camera icon representing the current audience virtual viewpoint and the second type of camera icon representing the abnormal viewpoint are superimposed, and transmits it to the terminal 102. That is, the image generating apparatus 101 notifies the terminal 102 of information about the quality of the virtual viewpoint image. Note that in addition to this, a virtual viewpoint image from the first virtual-viewpoint-image output unit 407 is also transmitted to the terminal 102, and thus transmission is performed to be able to discriminate between the images. For example, the terminal 102 has some ports for receiving information from the image generating apparatus 101, and information is transmitted to each port. The first and second types of camera icons desirably have different shapes or colors to be identifiable. Furthermore, the graphic information representing the soccer field and icons is drawing data in a simple vector format. However, image data in a bitmap format (note that image data is compressed) may be used.

Figure 12B:
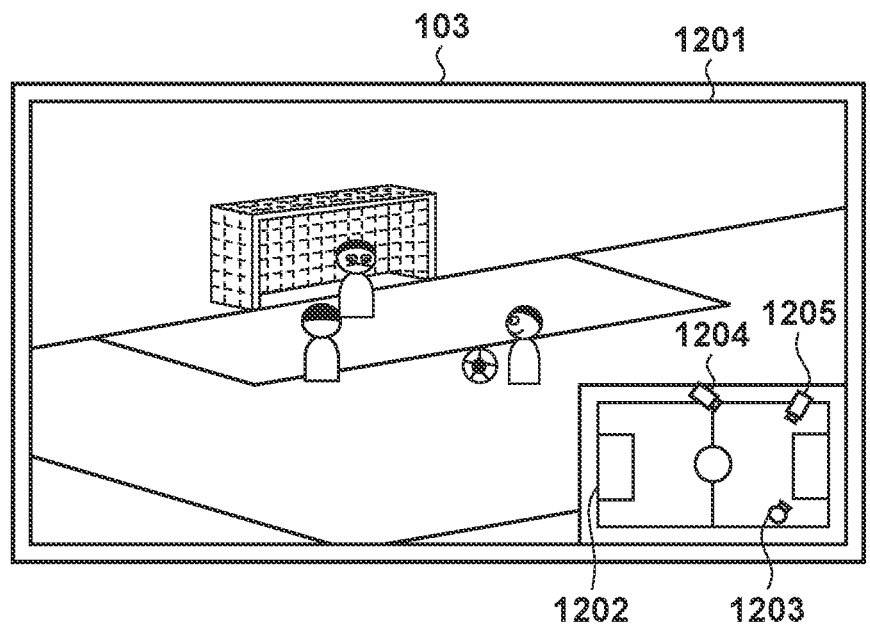

FIG. 12B is a view showing the display screen 103 of the terminal 102. As shown in FIG. 12B, a window 1201 for displaying a virtual viewpoint image seen from the audience virtual viewpoint and a window 1202 for confirming the current position of the virtual camera (virtual viewpoint) being operated by the virtual cameraman in the soccer field are individually displayed on the display screen 103. An image displayed on the latter window 1202 is an image drawn by the terminal 102 (the processor thereof) based on the drawing data received from the abnormal-viewpoint hold & output unit 417 of the image generating apparatus 101. In the example of FIG. 12B, icons 1204 and 1205 corresponding to two abnormal viewpoints input by the monitor are shown. For example, an icon 1203 being operated by the virtual cameraman is represented by a blue line segment, and the icons 1204 and 1205 indicating the abnormal viewpoints are represented by red line segments. That is, the terminal 102 notifies the virtual cameraman of the information about the quality of the virtual viewpoint image by displaying it. The terminal 102 notifies the virtual cameraman of the position and/or line-of-sight direction of the viewpoint at which a virtual viewpoint image with a missing object is generated or the position and/or line-of-sight direction of the viewpoint at which a virtual viewpoint image including noise is generated. By seeing the window 1202, the virtual cameraman can grasp the position and orientation of the virtual viewpoint in which an abnormal virtual viewpoint image is unwantedly generated. That is, the virtual cameraman operates the position and orientation of the virtual viewpoint (icon 1203) to avoid the above position and orientation, thereby avoiding an abnormal virtual viewpoint image from being generated.

According to the above-described embodiment, the virtual cameraman can perform an operation by confirming the positional relationship between the virtual viewpoint operated by himself/herself and the viewpoint position at which an abnormal virtual viewpoint image is generated, thereby viewing a natural virtual viewpoint image. As a result, it is also possible to generate a moving image file of a natural virtual viewpoint.

Note that in the above embodiment, the abnormal-viewpoint hold & output unit 417 of the image generating apparatus 101 generates the graphical drawing information to be displayed on the window 1202 shown in FIG. 12B. However, the abnormal-viewpoint hold & output unit 417 has a function of simply holding position and orientation information of an abnormal viewpoint but may only function as a virtual viewpoint transmission unit. That is, the abnormal-viewpoint hold & output unit 417 may have only a function of transmitting position and orientation information of an abnormal viewpoint to the terminal 102. In this case, the terminal 102 holds information for drawing a line drawing of the soccer field. Furthermore, the terminal 102 holds the position of the virtual viewpoint and the capturing direction during an operation by the virtual cameraman. The terminal 102 generates and draws an image of the window 1202 based on these pieces of information and the abnormal viewpoint information received from the image generating apparatus 101. As a result, it is possible to obtain the same effects as in the first embodiment.

In the embodiment, the terminals 102 and 105 have been described as individual apparatuses. However, one apparatus may have the functions of these two apparatuses. For example, this corresponds to an application for performing an operation of finding the positions and the number of abnormal viewpoints and creating a moving image file of a virtual viewpoint. In this case, the apparatus stores and holds in advance, in a storage device such as a hard disk, videos (moving images) captured by a plurality of image capturing apparatuses in synchronism with each other. At the first stage, processing of extracting the position and line-of-sight direction of an abnormal viewpoint is performed, and the information is stored and held. After that, at the second stage, a soccer field on which an icon indicating the position and orientation of the extracted abnormal viewpoint and an icon indicating the virtual viewpoint during the operation are superimposed is displayed, and then an operation of creating a moving image of the virtual viewpoint while changing the position and orientation of the virtual viewpoint is performed. In this case, the image generating apparatus 101 and the terminals 102 and 105 can be formed as one apparatus. The same applies to the second embodiment and subsequent embodiments to be described below.

In the embodiment, a notification of information about a low-quality image or a virtual viewpoint image in which an abnormality occurs is sent. An arrangement of sending a notification of information about a high-quality virtual viewpoint image may be adopted.

Second Embodiment

The second embodiment will describe an example of efficiently implementing overall bird's-eye monitoring by confirming only a region where an object exists when monitoring the quality of a virtual viewpoint image by observing an entire capturing region from above.

A reason why confirmation is limited to the region where the object exists will be explained. A free-viewpoint video is created by separating foreground image data and background image data, as described in the first embodiment. As the background portion of the free-viewpoint video, background image data captured in advance is used and thus the normal image quality is ensured. The background portion can be generated by simple combining processing. Therefore, the possibility that an image quality abnormality occurs in the background portion is very low. To the contrary, foreground image data of a number of image capturing camera videos are used for the foreground portion of the free-viewpoint video, that is, an object such as a so-called player, an abnormality in one camera directly affects an image quality abnormality in the free-viewpoint video. That is, the possibility that an image quality abnormality occurs in the foreground portion is high, as compared with the background portion. Therefore, the likelihood of abnormality detection increases by paying attention to only the region where the object exists and monitoring it. Furthermore, by decreasing the monitoring region, the processing load and the load of the monitor can be reduced.

Figure 13:
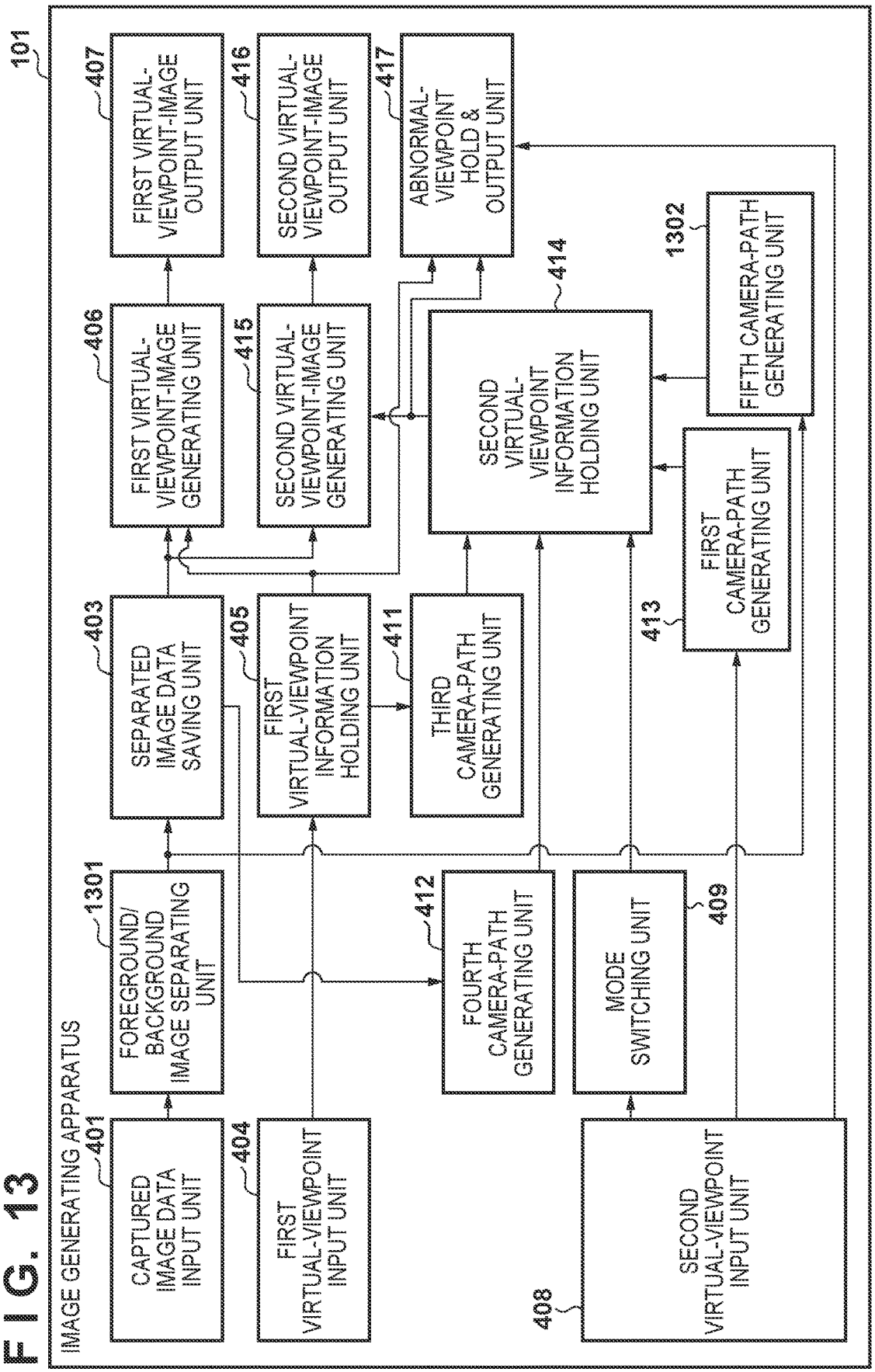
FIG. 13 is a functional block diagram showing an image generating apparatus according to the second embodiment.

Units having the same functions as in the first embodiment are denoted by the same reference numerals and a description thereof will be omitted. FIG. 13 is a functional block diagram showing an image generating apparatus 101 according to the second embodiment.

A foreground/background image separating unit 1301 outputs background image data and foreground image data to a separated image data saving unit 403. Furthermore, the foreground/background image separating unit 1301 outputs the foreground image data to a fifth camera-path generating unit 1302. The foreground image data also stores spatial position information of each foreground, that is, a so-called object.

The operation of a second virtual-viewpoint information holding unit 414 according to the second embodiment will be described next.

The second virtual-viewpoint information holding unit 414 confirms the current monitoring virtual viewpoint mode (step S501). If the monitoring virtual viewpoint mode is the overall bird's-eye monitoring mode (YES in step S502), the second virtual-viewpoint information holding unit 414 acquires virtual camera path information for foreground bird's-eye monitoring from the fifth camera-path generating unit 1302 (step S503).

Figure 14:
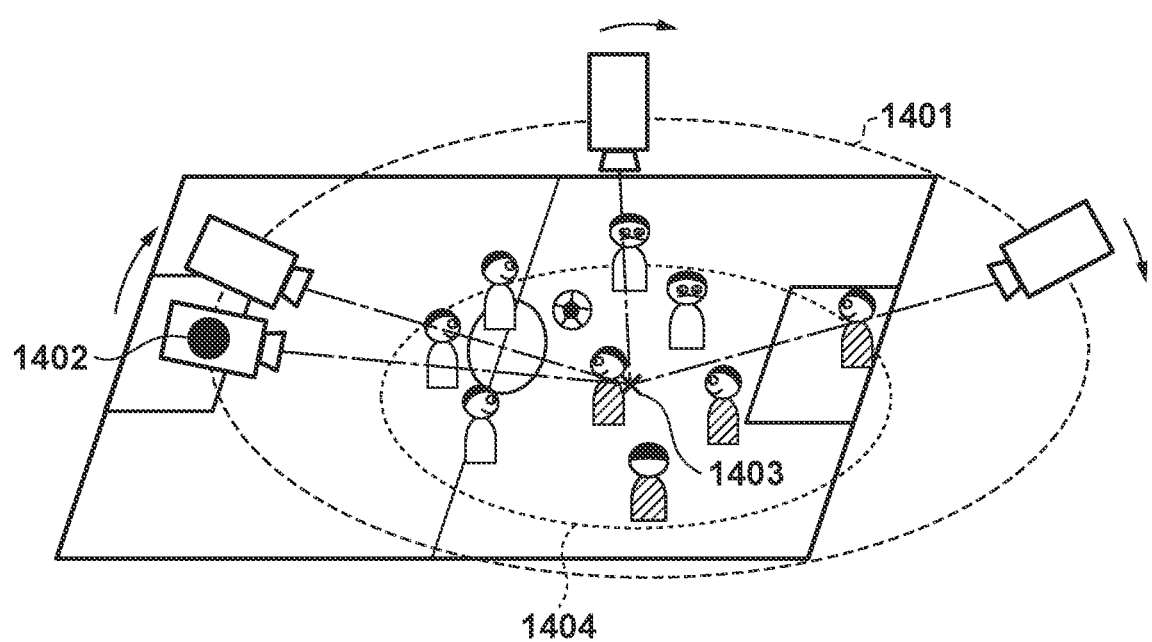
FIG. 14 is a conceptual view showing a foreground bird's-eye monitoring camera path according to the second embodiment.

FIG. 14 is a conceptual view showing a foreground bird's-eye monitoring camera path according to the second embodiment. A foreground bird's-eye monitoring path 1401 indicates a path along which a monitoring virtual camera moves from a movement start position 1402. The fifth camera-path generating unit 1302 acquires the foreground image data from the foreground/background image separating unit 1301, and confirms the spatial positions of all foregrounds. Next, the fifth camera-path generating unit 1302 obtains a foreground existence region 1404 as a region including all the foregrounds (a method of obtaining the foreground existence region will be described later). The fifth camera-path generating unit 1302 sets the direction of the camera so that a center 1403 of the foreground existence region 1404 is set at the center of a virtual camera image, and sets a path so that the entire foreground existence region 1404 falls within the virtual camera image. The fifth camera-path generating unit 1302 outputs, as virtual camera path information, a space curve equation indicating the thus set foreground bird's-eye monitoring path 1401 to the second virtual-viewpoint information holding unit 414.

Figure 15:
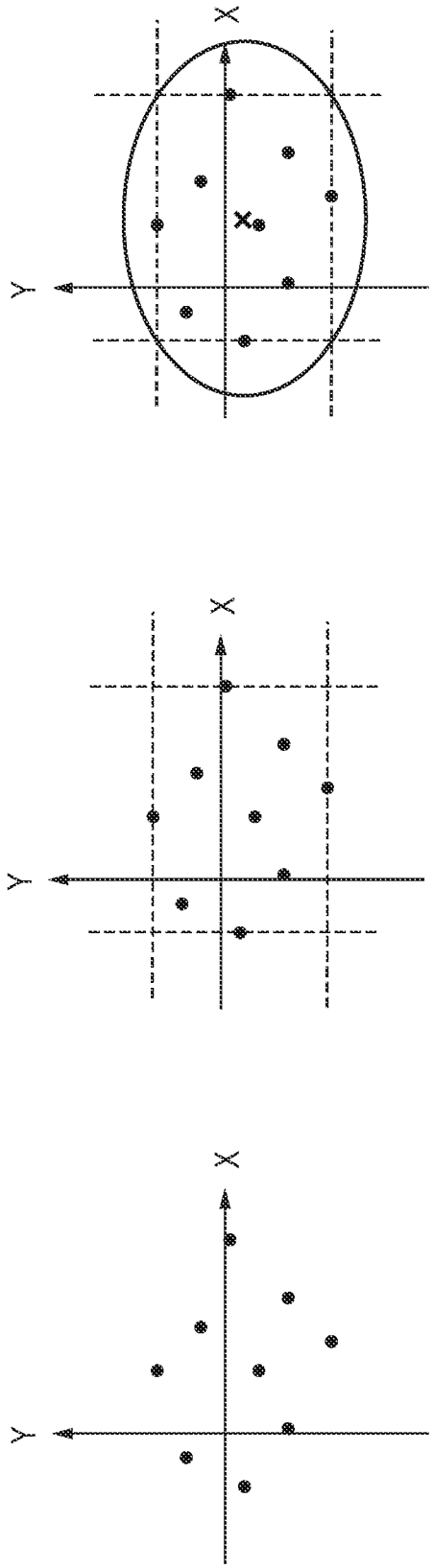
FIGS. 15A to 15C are views for explaining a method of obtaining a foreground existence region according to the second embodiment.

FIGS. 15A to 15C are views for explaining the method of obtaining the foreground existence region. FIG. 15A shows the positions of the foregrounds on the XY plane. First, the foregrounds at positions of the maximum and minimum values on the X-axis on which the objects (players) can be distributed are extracted to draw perpendiculars to the X-axis. The foregrounds at positions of the maximum and minimum values on the Y-axis are extracted to draw perpendiculars to the Y-axis. FIG. 15B shows the thus drawn four perpendiculars. Next, an ellipse of a size that passes through the four intersection points of the four perpendiculars (an ellipse of a minimum size including the four intersection points) is extracted. FIG. 15C shows the ellipse obtained as a result. This ellipse is determined as the foreground existence region, and the center of the ellipse is set as the center of the virtual camera image. Note that as the method of obtaining the foreground existence region, methods other than the above-described one may be used.

As described above, according to the second embodiment, before the virtual cameraman (the user of a terminal 102 for audience) moves the virtual camera to a position at which an abnormal virtual viewpoint image is obtained, it is possible to generate in advance a virtual viewpoint image for quality monitoring and detect an abnormality, and further confirm only the region where the object exists, thereby allowing the monitor to efficiently implement overall bird's-eye monitoring.

Third Embodiment

The third embodiment will describe an example of implementing, when monitoring the quality of a virtual viewpoint image by observing an entire capturing region from above, overall bird's-eye monitoring capable of monitoring the entire capturing region within a short time by dividing a region where an object can exist into at least two regions and confirming each region using a plurality of monitoring virtual cameras.

Units having the same functions as in the first embodiment are denoted by the same reference numerals and a description thereof will be omitted.

Figure 16:
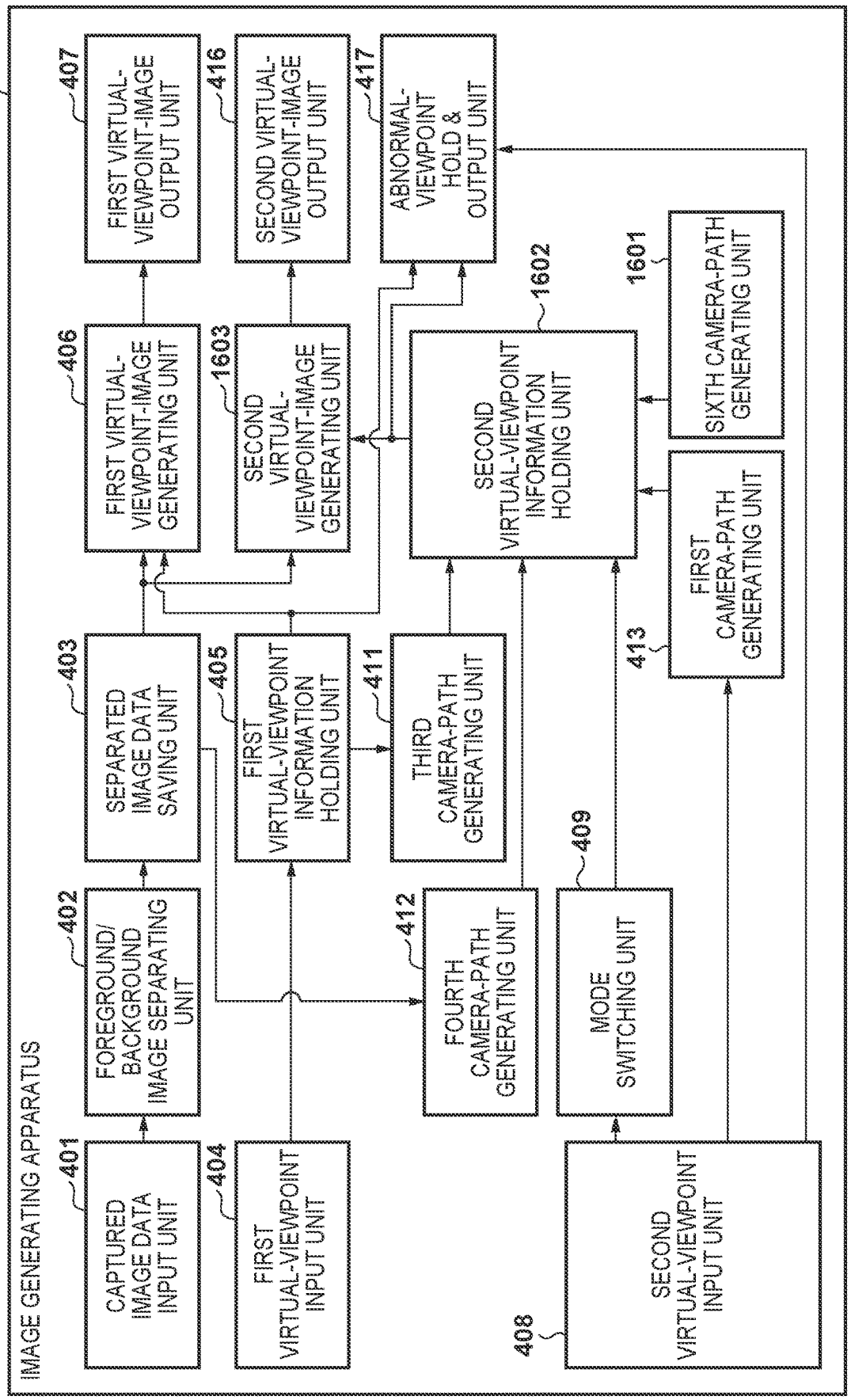
FIG. 16 is a functional block diagram showing an image generating apparatus according to the third embodiment.

FIG. 16 is a functional block diagram showing an image generating apparatus 101 according to the third embodiment. The operation of a second virtual-viewpoint information holding unit 1602 according to the third embodiment will be described below.

The second virtual-viewpoint information holding unit 1602 confirms the current monitoring virtual viewpoint mode (step S501). If the monitoring virtual viewpoint mode is the overall bird's-eye monitoring mode (YES in step S502), the second virtual-viewpoint information holding unit 1602 acquires at least two pieces of virtual camera path information for overall bird's-eye monitoring from a sixth camera-path generating unit 1601 (step S503).

Figure 17:
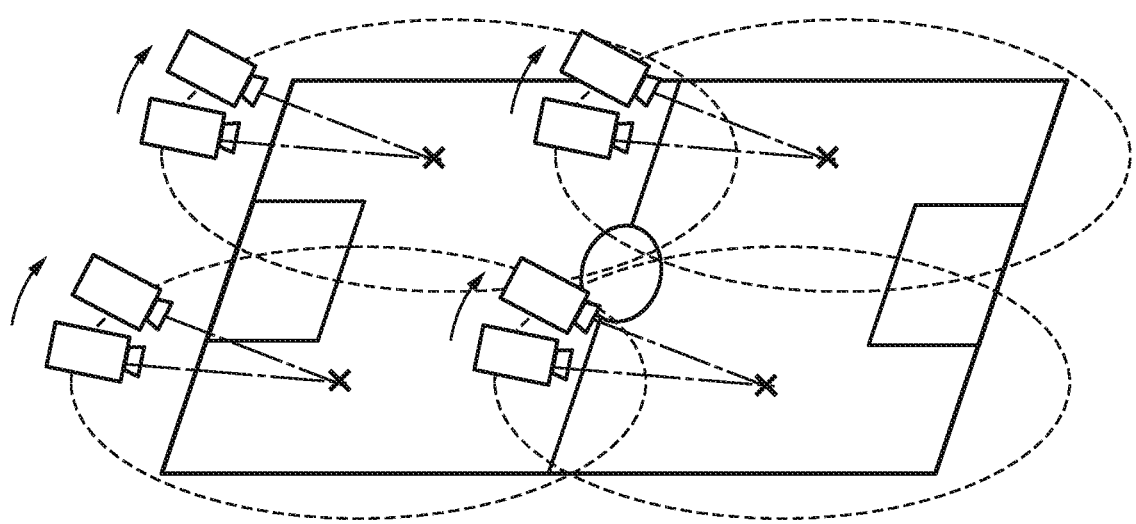
FIG. 17 is a conceptual view showing divided bird's-eye monitoring camera paths according to the third embodiment.

FIG. 17 is a conceptual view showing divided bird's-eye monitoring camera paths according to the third embodiment. A monitoring path is formed from four paths each for monitoring one divided region when a field is divided into four regions. The operation of each monitoring virtual camera is the same except for a monitoring region, as compared with the second camera-path generating unit 410 according to the first embodiment, and a description thereof will be omitted. In the example shown in FIG. 17, the sixth camera-path generating unit 1601 outputs four pieces of camera path information to the second virtual-viewpoint information holding unit 1602. After that, the second virtual-viewpoint information holding unit 1602 generates virtual viewpoint information from each piece of camera path information, and outputs it to a second virtual-viewpoint-image generating unit 1603.

Upon acquiring at least four pieces of virtual viewpoint information input from the second virtual-viewpoint information holding unit 1602, the second virtual-viewpoint-image generating unit 1603 generates a virtual viewpoint image based on each piece of virtual viewpoint information. After that, the second virtual-viewpoint-image generating unit 1603 generates one combined image by connecting the plurality of generated virtual viewpoint images, and outputs the combined image to the second virtual-viewpoint-image output unit 416.

Figure 18:
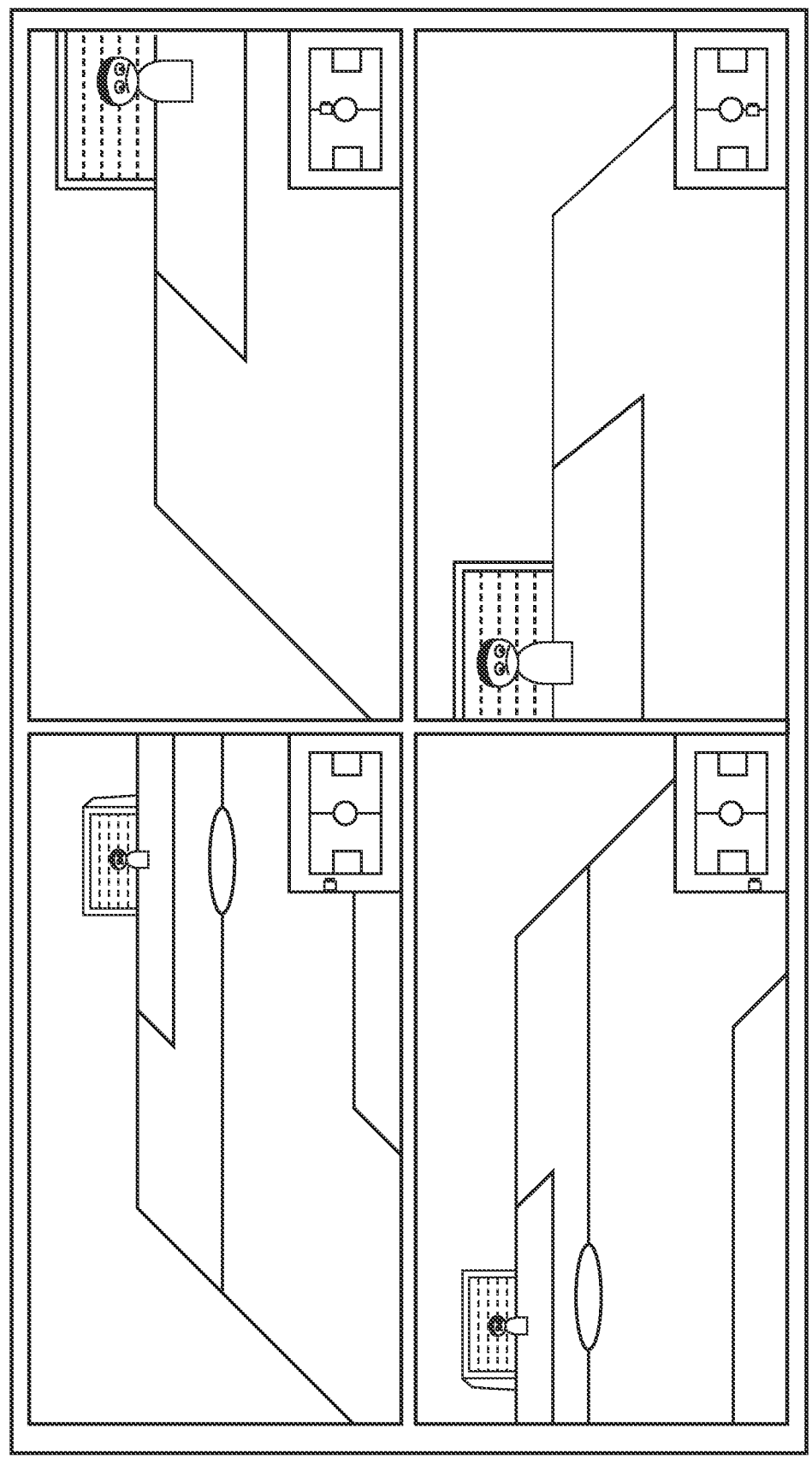
FIG. 18 is a view showing a display example of monitoring virtual camera images according to the third embodiment.

FIG. 18 shows a display example of monitoring virtual camera images according to the third embodiment. FIG. 18 shows a display example in the example of FIG. 17, in which four monitoring virtual camera images are divisionally displayed on one screen. In the third embodiment, the monitor can see the four images displayed at the same time. Therefore, a controller 107 has buttons or keys independently for the four images, each of which is used to indicate the occurrence of an abnormal image. If abnormalities occur in two images at the same time, the buttons or keys corresponding to the images are operated.

As described above, according to the third embodiment, before the virtual cameraman moves the virtual camera to a position at which an abnormal virtual viewpoint image is obtained, it is possible to generate in advance a virtual viewpoint image for quality monitoring and detect an abnormality, and further confirm images obtained using the plurality of monitoring virtual cameras and divisionally displayed on one screen, thereby allowing the monitor to monitor the entire region within a short time.

Note that in the above example, the screen is divided into four parts, and images are respectively displayed in the divided parts. However, a mode may be settable independently for each divided image.

Fourth Embodiment

The fourth embodiment will describe an example of implementing a technique capable of detecting an abnormality even if no monitor exists, by providing, in an image generating apparatus 101, processing of detecting an abnormality in a virtual viewpoint image and notifying the virtual cameraman of the abnormality, when monitoring the quality of the virtual viewpoint image by observing an entire capturing region from above.

Figure 19:
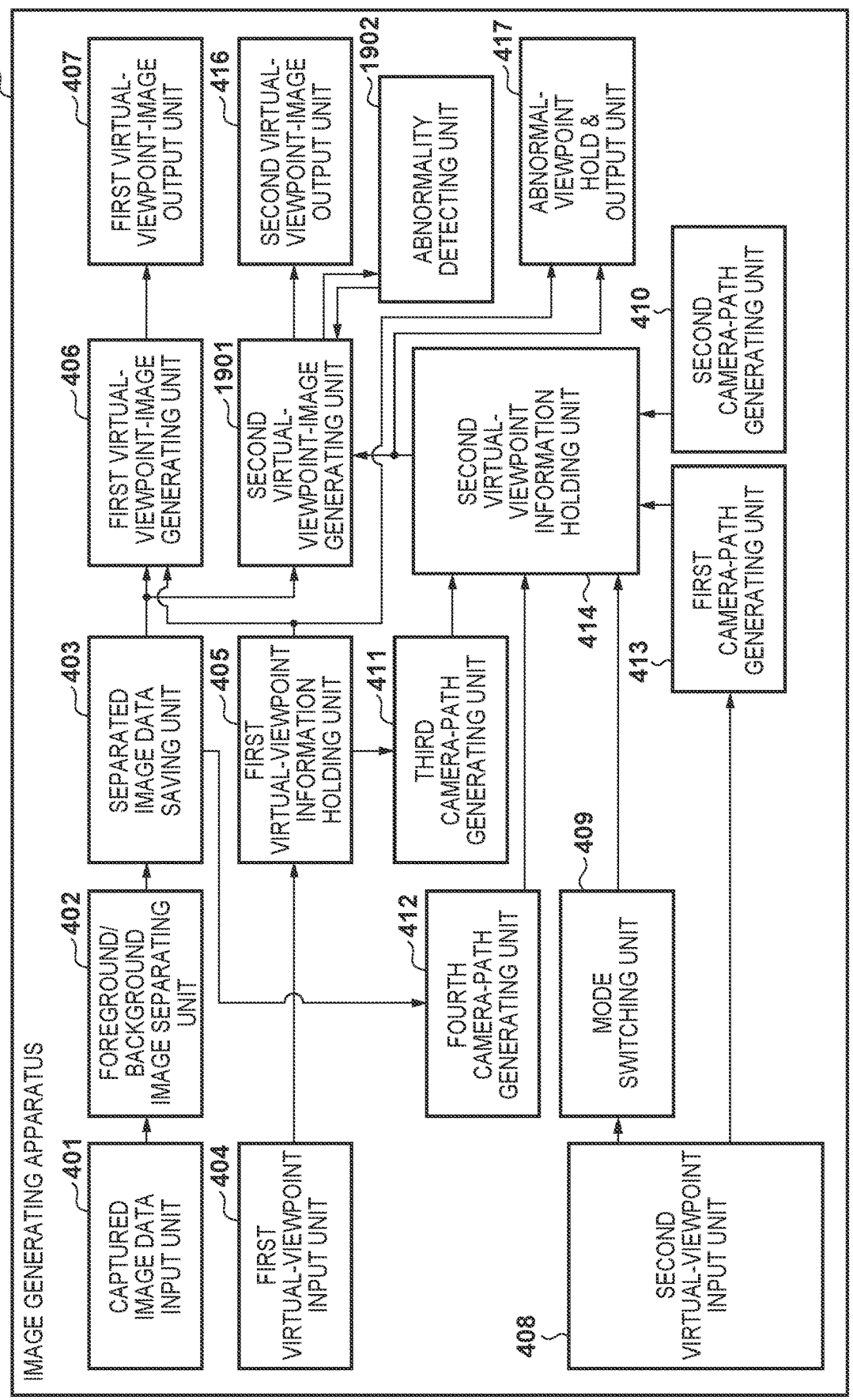
FIG. 19 is a functional block diagram showing an image generating apparatus according to the fourth embodiment.

Units having the same functions as in the first embodiment are denoted by the same reference numerals and a description thereof will be omitted. FIG. 19 is a functional block diagram showing the image generating apparatus 101 according to the fourth embodiment.

A second virtual-viewpoint-image generating unit 1901 acquires foreground image data and background image data corresponding to virtual viewpoint information from a separated image data saving unit 403, generates a virtual viewpoint image, and outputs it to an abnormality detecting unit 1902. After that, the abnormality detecting unit 1902 notifies the second virtual-viewpoint-image generating unit 1901 of the presence/absence of an abnormality and abnormality contents if the abnormality has occurred. If no abnormality has occurred, the second virtual-viewpoint-image generating unit 1901 outputs the generated virtual viewpoint image to a second virtual-viewpoint-image output unit 416. If the abnormality has occurred, the second virtual-viewpoint-image generating unit 1901 performs processing of making it possible to identify that the generated virtual viewpoint image includes abnormality contents, and outputs the processed virtual viewpoint image to the second virtual-viewpoint-image output unit 416. An example of the processing is processing of allowing the monitor to intuitively recognize that there is a possibility of an abnormality. Typically, processing of superimposing, in a corner of the virtual viewpoint image, a dialog indicating that the abnormality has occurred is performed, or the color of the outer frame of the virtual viewpoint image is set to a color different from a normal one. As a result, the monitor can grasp the occurrence of an abnormal viewpoint not only by visual observation but also under the support of the image generating apparatus 101.

Upon acquiring the monitoring virtual viewpoint image from the second virtual-viewpoint-image generating unit 1901, the abnormality detecting unit 1902 extracts Y components (luminance components) of all pixels. Next, the abnormality detecting unit 1902 extracts the maximum value of the Y components of all the pixels, and sets it as the maximum luminance of the virtual viewpoint image. The abnormality detecting unit 1902 extracts the minimum value of the Y components of all the pixels, and sets it as the minimum luminance of the virtual viewpoint image. The abnormality detecting unit 1902 obtains the average value of the Y components of all the pixels, and sets it as the average luminance of the virtual viewpoint image. That is, the abnormality detecting unit 1902 extracts three data of the maximum luminance, minimum luminance, and average luminance for each virtual viewpoint image. Furthermore, as for the average luminance, the average luminance values for last 3 sec are stored and held. That is, for a moving image of 60 fps, the abnormality detecting unit 1902 records the average luminance values of 180 virtual viewpoint images.

The abnormality detecting unit 1902 detects whether a highlight-detail loss abnormality has occurred in the virtual viewpoint image. The highlight-detail loss indicates a state in which there is no image data since an image is saturated with white, and is an abnormality that cannot be recovered even in a subsequent editing process. It is confirmed whether the maximum luminance value obtained from the virtual viewpoint image acquired from the second virtual-viewpoint-image generating unit 1901 is equal to or larger than the upper limit value of the Y component. The upper limit value of the Y component corresponds to, for example, "940" for a 10-bit image. If the maximum luminance value of the Y component is equal to or larger than the upper limit value, the abnormality detecting unit 1902 determines that a highlight-detail loss abnormality has occurred, and outputs information indicating the determination result to the second virtual-viewpoint-image generating unit 1901.

If no highlight-detail loss abnormality has occurred, the abnormality detecting unit 1902 detects whether a shadow-detail loss abnormality has occurred in the virtual viewpoint image. The shadow-detail loss indicates a state in which there is no image data since an image is saturated with black, and is an abnormality that cannot be recovered even in a subsequent editing process. It is confirmed whether the minimum luminance value obtained from the virtual viewpoint image acquired from the second virtual-viewpoint-image generating unit 1901 is equal to or smaller than the lower limit value of the Y component. The lower limit value of the Y component corresponds to, for example, "64" for a 10-bit image. If the minimum luminance value is equal to or smaller than the lower limit value of the Y component, the abnormality detecting unit 1902 determines that a shadow-detail loss abnormality has occurred, and outputs information indicating the determination result to the second virtual-viewpoint-image generating unit 1901.

If no shadow-detail loss abnormality has occurred, the abnormality detecting unit 1902 confirms the recorded luminance transition of the virtual viewpoint images for 3 sec, and detects whether the brightness of the image suddenly changes. More specifically, the abnormality detecting unit 1902 sets, as the maximum average luminance and the minimum average luminance, the maximum and minimum values of the average luminances of the virtual viewpoint images for 3 sec, respectively. If the difference between the maximum average luminance and the minimum average luminance exceeds, for example, "200", the abnormality detecting unit 1902 determines that a luminance sudden change abnormality has occurred, and outputs information indicating the determination result to the second virtual-viewpoint-image generating unit 1901. As a reason for detecting a luminance sudden change abnormality, for example, if the virtual viewpoint image suddenly changes from a sunny image to a shadowy image due to movement of the virtual camera or a change in direction of the virtual camera, an audience who is viewing the virtual viewpoint image is surprised and feels uncomfortable. Therefore, this case is avoided by notifying the virtual cameraman that this movement path of the monitoring virtual camera should not be used.

Finally, if no luminance sudden change is detected, the abnormality detecting unit 1902 outputs information indicating a normal state to the second virtual-viewpoint-image generating unit 1901.

Note that in this example, the unit for detecting an abnormality associated with exposure is used. However, the abnormality detecting unit 1902 may use a method other than the method using the Y components of the virtual viewpoint image. Furthermore, an abnormality other than an exposure abnormality may be detected. For example, analysis by histograms or a method of detecting noise such as block noise or mosquito noise may be used, and the present invention is not specifically limited.

As described above, according to the fourth embodiment, before the virtual cameraman moves to a position at which an abnormal virtual viewpoint image is obtained, it is possible to generate in advance a virtual viewpoint image for quality monitoring and detect an abnormality, and further provide a unit for automatically detecting an abnormality in the image generating apparatus and notify the virtual cameraman of the abnormality, thereby making it possible to detect an abnormality even if no monitor exists.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-115406, filed Jun. 12, 2017 which is hereby incorporated by reference herein in its entirety.

What is claimed is:

1. An information processing apparatus comprising:
   one or more memories configured to store instructions; and
   one or more processors configured to execute the instructions to:
   generate a virtual viewpoint image based on first information about at least one of (i) a position of a viewpoint input from a user through another apparatus and (ii) a direction from the viewpoint input from the user through the another apparatus and based on images from a plurality of image capturing apparatuses; and transmit, to the another apparatus, the generated virtual viewpoint image and second information for prompting the user to avoid designating a specific viewpoint.

2. The apparatus according to claim 1, wherein, as the second information, third information about at least one of a position of a viewpoint at which a virtual viewpoint image with a missing object and a direction from the viewpoint in which a virtual viewpoint image with a missing object is generated or fourth information about at least one of a position of a viewpoint at which a virtual viewpoint image with noise is generated and a direction from the viewpoint in which a virtual viewpoint image with noise is generated is transmitted.

3. The apparatus according to claim 1, wherein the virtual viewpoint image and the second information are transmitted to the another apparatus that displays the virtual viewpoint image and an image based on the second information.

4. The apparatus according to claim 1, wherein a virtual viewpoint image is generated based on a virtual viewpoint that moves along a predetermined path at a predetermined speed.

5. The apparatus according to claim 1, wherein a virtual viewpoint image is generated based on a virtual viewpoint that moves around a predetermined region.

6. The apparatus according to claim 1, wherein a virtual viewpoint image is generated based on a virtual viewpoint that moves in accordance with a position of a virtual viewpoint designated by another information processing apparatus.

7. The apparatus according to claim 1, wherein a virtual viewpoint image is generated based on a position of a viewpoint and a direction from a viewpoint automatically, sequentially updated.

8. The apparatus according to claim 1,
wherein the one or more processors further execute the instructions to receive input information input by another user, and
wherein the second information for prompting the user to avoid designating the specific viewpoint is transmitted based on the received input information.

9. The apparatus according to claim 8, wherein:
an instruction is received by the another user to select one of a plurality of modes associated with movement of a virtual viewpoint; and
a virtual viewpoint image is generated based on the selected mode.

10. The apparatus according to claim 9, wherein the plurality of modes include
a mode of moving, at a predetermined speed, a virtual viewpoint along a path for observing, from above, an entire region where an object can exist,
a mode of estimating a moving direction of a virtual viewpoint requested by the user and moving the virtual viewpoint in the estimated moving direction,
a mode of setting, as a monitoring target, a preset region where quality of an object readily degrades, and moving a virtual viewpoint around the region at a predetermined speed, and
a mode of moving a virtual viewpoint depending on only an operation by the another user.

11. The apparatus according to claim 8, wherein information graphically representing a position of a virtual viewpoint and a direction from the virtual viewpoint corresponding to the generated virtual viewpoint image and a position of a virtual viewpoint and a direction from the virtual viewpoint corresponding to the input information input by the another user are transmitted.

12. The apparatus according to claim 10, wherein the plurality of modes include a mode of detecting, based on a distribution of objects, a smallest region including the objects and moving a virtual viewpoint so as to observe the smallest region from above.

13. The apparatus according to claim 8,
wherein the one or more processors further execute the instructions to generate one image by dividing a region where an object can exist into a preset number of regions and combining virtual viewpoint images for observing the respective divided regions from above, and
wherein when performing transmission to the another user, the combined image is transmitted.

14. The apparatus according to claim 1, wherein the presence/absence of an abnormality in a current virtual viewpoint image is estimated based on a maximum luminance, an average luminance, and a minimum luminance of luminance components in virtual viewpoint images generated from a preset past timing to a current timing, and in a case where the abnormality is estimated, a virtual viewpoint image added with information indicating that the abnormality is estimated is generated.

15. The apparatus according to claim 8, wherein the second input information includes information indicating that the generated virtual viewpoint image is abnormal.

16. A control method for an information processing apparatus, comprising:
generating a virtual viewpoint image based on first information about at least one of (i) a position of a viewpoint input from a user through another apparatus and (ii) a direction from the viewpoint input from the user through the another apparatus and based on images from a plurality of image capturing apparatuses; and
transmitting, to the another apparatus, the generated virtual viewpoint image and second information for prompting the user to avoid designating a specific viewpoint.

17. A non-transitory computer-readable storage medium storing a program which, when executed by a computer, causes the computer to execute a control method for an information processing apparatus, the control method comprising:
generating a virtual viewpoint image based on first information about at least one of (i) a position of a viewpoint input from a user through another apparatus and (ii) a direction from the viewpoint input from the user through the another apparatus and based on images from a plurality of image capturing apparatuses; and
transmitting, to the another apparatus, the generated virtual viewpoint image and second information for prompting the user to avoid designating a specific viewpoint.

* * * * *